(12) United States Patent
Lindholm et al.

(10) Patent No.: US 12,470,387 B2
(45) Date of Patent: Nov. 11, 2025

(54) WORKLOAD IDENTITY RESOURCE PRINCIPLE

(71) Applicant: Oracle International Corporation, Redwood Shores, CA (US)

(72) Inventors: Jacob M. Lindholm, Londonderry, NH (US); Joshua Aaron Horwitz, Centreville, VA (US)

(73) Assignee: Oracle International Corporation, Redwood Shores, CA (US)

( * ) Notice: Subject to any disclaimer, the term of this patent is extended or adjusted under 35 U.S.C. 154(b) by 121 days.

(21) Appl. No.: 18/422,916

(22) Filed: Jan. 25, 2024

(65) Prior Publication Data

US 2025/0030549 A1  Jan. 23, 2025

Related U.S. Application Data

(60) Provisional application No. 63/528,210, filed on Jul. 21, 2023.

(51) Int. Cl.
*H04L 9/32*  (2006.01)
*G06F 16/27*  (2019.01)
*H04L 9/40*  (2022.01)

(52) U.S. Cl.
CPC .......... *H04L 9/3213* (2013.01); *G06F 16/27* (2019.01); *H04L 63/083* (2013.01)

(58) Field of Classification Search
CPC ... H04L 9/3213; H04L 63/083; H04L 9/3247; H04L 63/0807; G06F 16/27
See application file for complete search history.

(56) References Cited

U.S. PATENT DOCUMENTS 10,680,827 B2 * 6/2020 Barbour ............... H04L 9/3247
11,431,513 B1 * 8/2022 Cannata ............... H04L 9/3213
(Continued)

FOREIGN PATENT DOCUMENTS

EP   3416333 A1   12/2018

OTHER PUBLICATIONS

"Granting Workloads Access to OCI Resources", Available Online at: https://docs.oracle.com/en-us/iaas/Content/ContEng/Tasks/contenggrantingworkloadaccesstoresources.htm, Jul. 12, 2023, 17 pages.
(Continued)

*Primary Examiner* — Darren B Schwartz
(74) *Attorney, Agent, or Firm* — Kilpatrick Townsend & Stockton LLP

(57) ABSTRACT

Techniques are described herein for authenticating a pod. A method can include a manager instance receiving a first request for a first token to access a computing resource. The manager instance can determine an identity of the service account and generate a second request for the first token based at least in part on the authentication. The manager instance can transmit the second request to a token issuance service of the computing system. The token issuance service can generate a third request for the first token, the third request comprising the identity of the service account and a token issuance service signature. The token issuance service can transmit the third request to an identity service of the computing system. The identity service can generate the first token based at least in part on determining whether to generate the first token.

20 Claims, 12 Drawing Sheets

(56) References Cited

U.S. PATENT DOCUMENTS

| | | | |
|---|---|---|---|
| 2017/0339196 A1* | 11/2017 | Lewis | H04L 63/083 |
| 2018/0083971 A1* | 3/2018 | Brown | H04L 63/126 |
| 2018/0309759 A1 | 10/2018 | Leibmann et al. | |
| 2018/0367528 A1* | 12/2018 | Schwarz | H04L 63/0807 |
| 2021/0157896 A1 | 5/2021 | Hashmi et al. | |
| 2021/0328793 A1* | 10/2021 | Saravanan | G06F 21/53 |
| 2021/0377044 A1* | 12/2021 | Leibmann | H04L 9/3247 |
| 2023/0163967 A1* | 5/2023 | Cannata, Jr. | H04L 9/3263 |
| | | | 713/156 |

OTHER PUBLICATIONS

International Patent Application No. PCT/US2024/036357, "International Search Report and Written Opinion", Sep. 25, 2024, 14 pages.

\* cited by examiner

500

Example Policy

Allow any user to manage objects in tenancy where all {

502 —— request.principal.type='workload',

504 —— request.principal.cluster_id=<cluster_id>,

506 —— request.principal.namespace = <namespace>, request.principal.service_account=<service_account>

WORKLOAD IDENTITY RESOURCE PRINCIPLE

CROSS-REFERENCES TO RELATED APPLICATIONS

This application claims the benefit of U.S. Provisional Application No. 63/528,210, filed on Jul. 21, 2023, which is incorporated by reference in its entirety.

BACKGROUND

A cloud service provider (CSP) can provide multiple cloud services to subscribing customers. These services are provided under different models, including a Software-as-a-Service (SaaS) model, a Platform-as-a-Service (PaaS) model, an Infrastructure-as-a-Service (IaaS) model, and others.

BRIEF SUMMARY

Embodiments described herein are directed toward a method for authenticating a pod. The method can include a manager instance of a computing system receiving a first request from a computing process of a plurality of computing processes associated with a service account for a first token to access to a computing resource. The request can include a second token associated with the computing process.

The method can further include the manager instance of the computing system, authenticating the first request based at least in part on the second token.

The method can further include the manager instance of the computing system determining an identity of the service account based at least in part on the authentication.

The method can further include the manager instance of the computing system generating a second request for the first token based at least in part on the authentication, the second request comprising a manager instance signature and the identity of the service account.

The method can further include the manager instance of the computing system transmitting the second request to a token issuance service of the computing system.

The method can further include the token issuance service of the computing system authenticating the second request based at least in part on the manager instance signature.

The method can further include the token issuance service of the computing system generating a third request for the first token, the third request comprising the identity of the service account and a token issuance service signature.

The method can further include the token issuance service of the computing system transmitting the third request to an identity service of the computing system.

The method can further include the identity service of the computing system authenticating the third request based at least in part on the token issuance service signature;

The method can further include the identity service of the computing system determining whether to generate the first token based at least in part on the identity of the service account, a policy associated with the service account, and the authentication.

The method can further include the identity service of the computing system generating the first token based at least in part on determining whether to generate the first token.

Embodiments can further include a computing system, including one or more processors and a computer-readable medium including instructions that, when executed by the processor, can cause the one or more processors to perform operations including receiving a first request from a computing process of a plurality of computing processes associated with a service account for a first token to access to a computing resource. The request can include a second token associated with the computing process.

The instructions that, when executed by the one or more processors, can further cause the one or more processors to perform operations including the manager instance of the computing system, authenticating the first request based at least in part on the second token.

The instructions that, when executed by the one or more processors, can further cause the one or more processors to perform operations including the manager instance of the computing system determining an identity of the service account based at least in part on the authentication.

The instructions that, when executed by the one or more processors, can further cause the one or more processors to perform operations including the manager instance of the computing system generating a second request for the first token based at least in part on the authentication, the second request comprising a manager instance signature and the identity of the service account.

The instructions that, when executed by the one or more processors, can further cause the one or more processors to perform operations including the manager instance of the computing system transmitting the second request to a token issuance service of the computing system.

The instructions that, when executed by the one or more processors, can further cause the one or more processors to perform operations including the token issuance service of the computing system authenticating the second request based at least in part on the manager instance signature.

The instructions that, when executed by the one or more processors, can further cause the one or more processors to perform operations including the token issuance service of the computing system generating a third request for the first token, the third request comprising the identity of the service account and a token issuance service signature.

The instructions that, when executed by the one or more processors, can further cause the one or more processors to perform operations including the token issuance service of the computing system transmitting the third request to an identity service of the computing system.

The instructions that, when executed by the one or more processors, can further cause the one or more processors to perform operations including the identity service of the computing system authenticating the third request based at least in part on the token issuance service signature;

The instructions that, when executed by the one or more processors, can further cause the one or more processors to perform operations including the identity service of the computing system determining whether to generate the first token based at least in part on the identity of the service account, a policy associated with the service account, and the authentication.

The instructions that, when executed by the one or more processors, can further cause the one or more processors to perform operations including the identity service of the computing system generating the first token based at least in part on determining whether to generate the first token.

Embodiments can further include a non-transitory computer-readable medium having stored thereon instructions that, when executed by one or more processors, causes the one or more processors to perform operations including receiving a first request from a computing process of a plurality of computing processes associated with a service account for a first token to access to a computing resource. The request can include a second token associated with the computing process.

The instructions that, when executed by the one or more processors, can further cause the one or more processors to perform operations including the manager instance of the computing system, authenticating the first request based at least in part on the second token.

The instructions that, when executed by the one or more processors, can further cause the one or more processors to perform operations including the manager instance of the computing system determining an identity of the service account based at least in part on the authentication.

The instructions that, when executed by the one or more processors, can further cause the one or more processors to perform operations including the manager instance of the computing system generating a second request for the first token based at least in part on the authentication, the second request comprising a manager instance signature and the identity of the service account.

The instructions that, when executed by the one or more processors, can further cause the one or more processors to perform operations including the manager instance of the computing system transmitting the second request to a token issuance service of the computing system.

The instructions that, when executed by the one or more processors, can further cause the one or more processors to perform operations including the token issuance service of the computing system authenticating the second request based at least in part on the manager instance signature.

The instructions that, when executed by the one or more processors, can further cause the one or more processors to perform operations including the token issuance service of the computing system generating a third request for the first token, the third request comprising the identity of the service account and a token issuance service signature.

The instructions that, when executed by the one or more processors, can further cause the one or more processors to perform operations including the token issuance service of the computing system transmitting the third request to an identity service of the computing system.

The instructions that, when executed by the one or more processors, can further cause the one or more processors to perform operations including the identity service of the computing system authenticating the third request based at least in part on the token issuance service signature;

The instructions that, when executed by the one or more processors, can further cause the one or more processors to perform operations including the identity service of the computing system determining whether to generate the first token based at least in part on the identity of the service account, a policy associated with the service account, and the authentication.

The instructions that, when executed by the one or more processors, can further cause the one or more processors to perform operations including the identity service of the computing system generating the first token based at least in part on determining whether to generate the first token.

BRIEF DESCRIPTION OF THE DRAWINGS

FIG. 5 is an illustration of an example policy, according to one or more embodiments.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

A cloud service provider (CSP) customer can manage multiple pods as part of their customer tenancy, where each pod includes one or more containers and their shared storage. A customer application can use code contained in different pods to collectively perform a task (e.g., authenticate a user password). In some instances, the code can, in some cases, require the use of one or more cloud resources to execute the task (e.g., access an object store). The customer can write a policy against the token for a pod to either grant or deny permission to access the one or more resources. For example, the customer can write a policy that pod A can always access customer resource A. Therefore, if pod A makes a call for customer resource A, pod A can access to customer resource A based on the policy.

One issue that can occur is that if there are multiple pods used to perform the task, the customer may only have written a policy for one pod and neglected to write a policy for another pod. In other words, if the customer tenancy included pod A and pod B, and the customer wrote a policy for pod A, the policy would not be valid for pod B. The customer could write duplicate policies for pod A and pod B. This can be a time-consuming task, and if there are a large number of pods, the customer may neglect to duplicate the policy for a pod. However, there may be no mechanism for providing the customer with the ability to write a policy that covers all of the pods. Additionally, there may be no way for the CSP to distinguish a valid request from a pod (e.g., a request for which a customer inadvertently neglected write a policy for granting resource access) from an invalid request (e.g., a request for which a customer intentionally neglected write a policy for granting resource access).

Embodiments described-herein address the above referenced issues by providing techniques permitting a customer to write a policy that covers all of the pods via a workload token. A workload (also known as a service account) can be one or more components that work together to perform a task (e.g., causing a computing device to access a virtual private network). The workload can bind a group of pods, and the workload token can bind the pods to the same policy. By binding each of the pods to the same workload token, the customer can write a policy for the workload and have the policy cover each of the pods.

Figure 1:
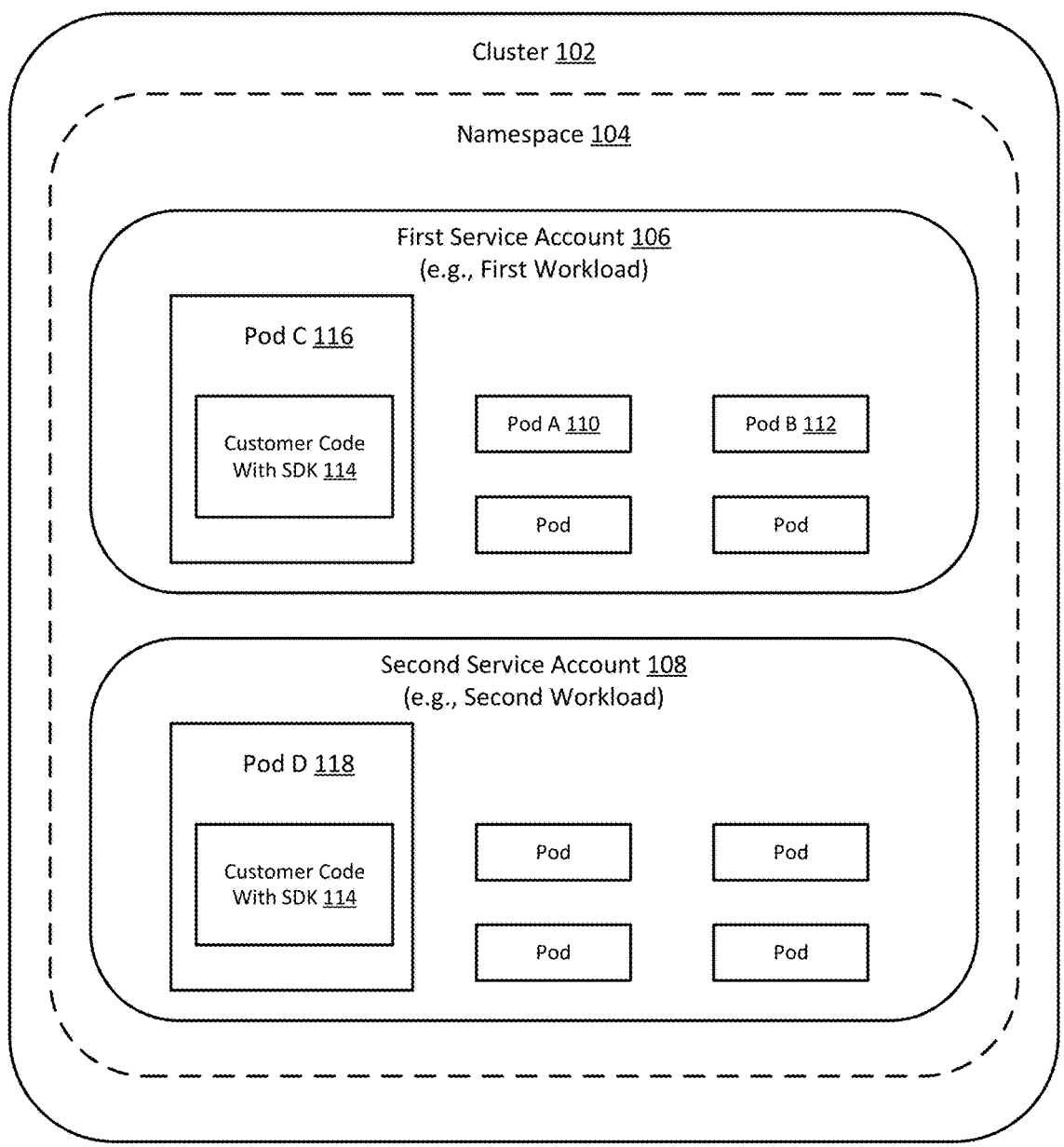
FIG. 1 is an illustration of an example of a system for implementing a service account, according to one or more embodiments.

FIG. 1 is an illustration of an example system 100 for implementing a service account, according to one or more embodiments. A cluster 102 can include containerized applications and services that are managed by one or more worker machines. A cloud services provider (CSP) can use the cluster 102 to provide its customers availability and scalability of their applications and services, and the management of the customer's workloads. A worker node can host one or more pods that are each components of an application workload. The namespace 104 can include an identifier that provides a means to segregate resources. This example system 100 can be implemented by cloud service infrastructure as described below.

The namespace 104 can be associated with a first service account 106 and a second service account 108. Each service account can allow a customer to write policies (e.g., policy to enable the service account to scale up the number of pods in cluster) and otherwise manage permissions to use internal resources. Each of the first service account 106 and the second service account 108 can span multiple pods. Each pod can include one or more containers and can be associated with a software developer kit (SDK). The SDK can include, for example, a compiler, library, analytics tools, and other tools and resources that a customer can use to write code and make application programming interface (API) calls to access a CSP's resources.

The customer can further write a policy that enables a pod to access one or more resources of the CSP. As indicated above, in a conventional system, the customer may inadvertently neglect to write a policy for allowing a pod to access a CSP resource. For example, a customer may write a policy that permits pod A 110 to access CSP resource X. Furthermore, the customer may have inadvertently neglected to write a policy that permits pod B 112 to access CSP resource X. Therefore, if pod A 110 makes an API call to access resource X, the policy will permit pod A to access resource X. If, however, pod B 112 makes an API call to access CSP resource X, the lack of policy can prevent pod B 112 from accessing the resource. This can hold, even though both pod A and pod B are associated with the first service account 106.

Embodiments described herein introduce an authorization provider (see, FIG. 2) that can request a workload token to permit the pod to access a CSP resource. In this sense, even if a customer inadvertently neglects to write a policy permitting a pod access to a CSP resource, the authorization provider can request a token that permits the pod to access the CSP resource. Furthermore, the token can be associated with the cluster, the namespace and the service account. Therefore, in the event that customer code from pod C 116 is copied into pod D of the second service account 108, the token would not enable pod D 118 to access the CSP resource, as pod D is associated with the second service account 108 and not the first service account 106.

Figure 2:
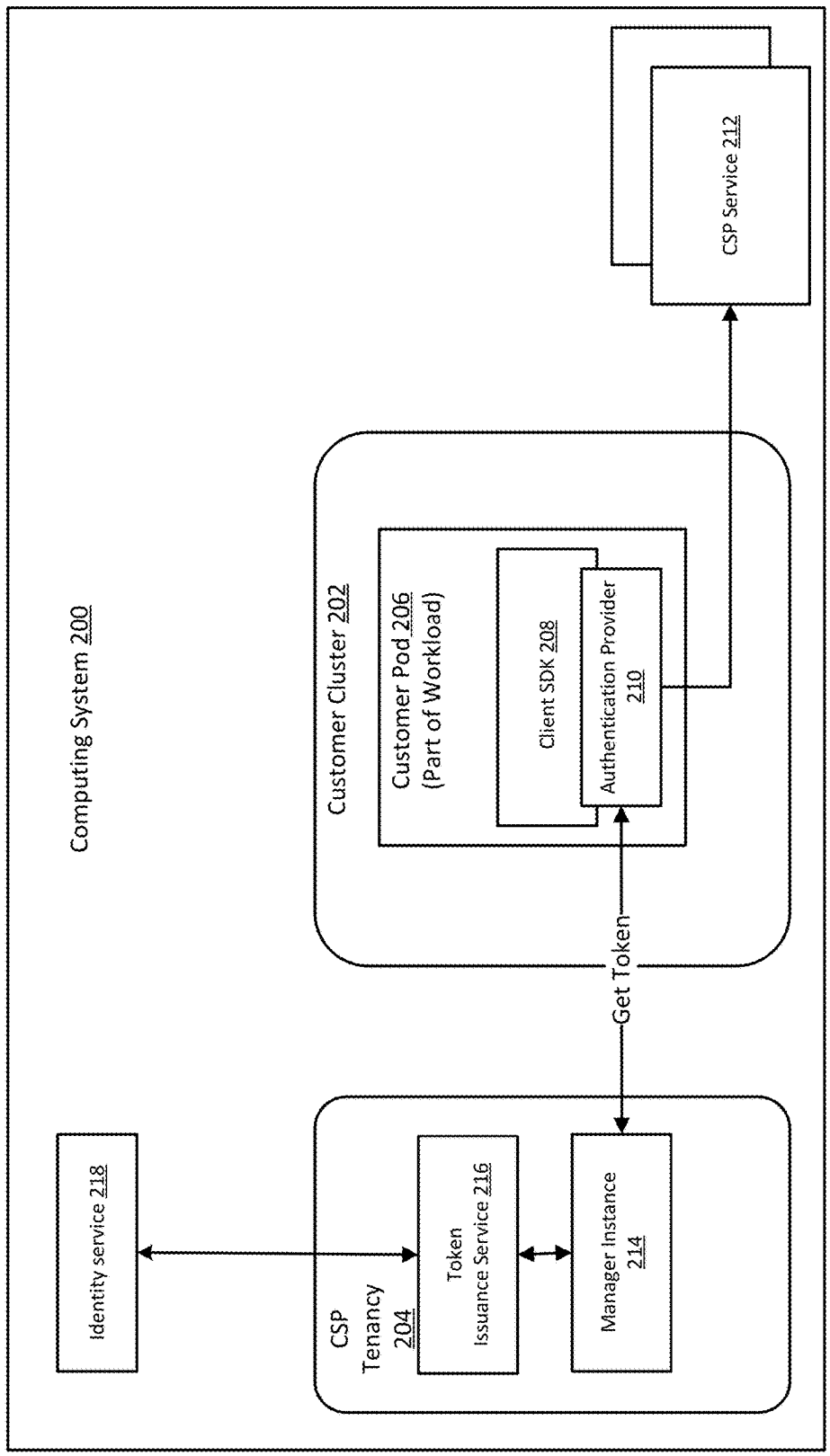
FIG. 2 is an illustration of an example system for authenticating a pod, according to one or more embodiments.

FIG. 2 is an illustration of an example system 200 for authenticating a pod, according to one or more embodiments. A customer cluster 202 (e.g., customer cluster 102) can be in operable communication with a CSP tenancy 204. The customer cluster 202 can include a customer pod 206 (e.g., pod C 116), that in turn can include a SDK 208 (e.g., SDK 114). The SDK 208 can include an authentication provider 210. The authentication provider 210 can include software for requesting a token to authenticate the combination of the namespace (e.g., namespace 104), customer pod 206, and the service account (e.g., the first service account 106).

The authentication provider 210 can detect that customer pod 206 is attempting to access a CSP resource. For example, the authentication provider can intercept an API call to CSP service 212 for the CSP resource. In response, the authentication provider 210 can generate a request for a workload token and transmit the request to the CSP tenancy 204. The authentication provider's request can be received by a manager instance 214. The manager instance 214 can manage one or more customer clusters. The manager instance 214, can authenticate the token request from the authentication provider 210. As used herein authentication can include authentication of an identity of a request sender and determining whether the sender is authorized to make the request. The manager instance 214 can transmit the request to a token issuance service 216. The token issuance service 216 can authenticate the request from the manager instance 214. The token issuance service 216 can transmit a token request to an identity service 218. The identity service 218 can authenticate the request from the token issuance service 216 and generate a workload token to be used to authenticate the customer pod's request. The identity service 218 can transmit the workload token to the token issuance service 216. The token issuance service 216 can transmit the workload token to the manager instance 214. The manager instance 214 can transmit the workload token to the authentication provider 210.

The authentication provider 210 can transmit the workload token and the request (e.g., intercepted API call) to access the CSP resource from the CSP service 212. The message can include an identification of the cluster 202, namespace, and the service account. The authentication provider 210 can send the workload token and the request in the same message or in different messages. The CSP service 212 can use the workload token to authenticate the customer pod 206 and provide access to the resource. As the workload token is associated with the customer cluster 202, the namespace, and the service account, in the event that another pod of the service account wants to access the resource, the authentication provider 210 can use the same workload token to send a request to the CSP service 212.

Figure 3:
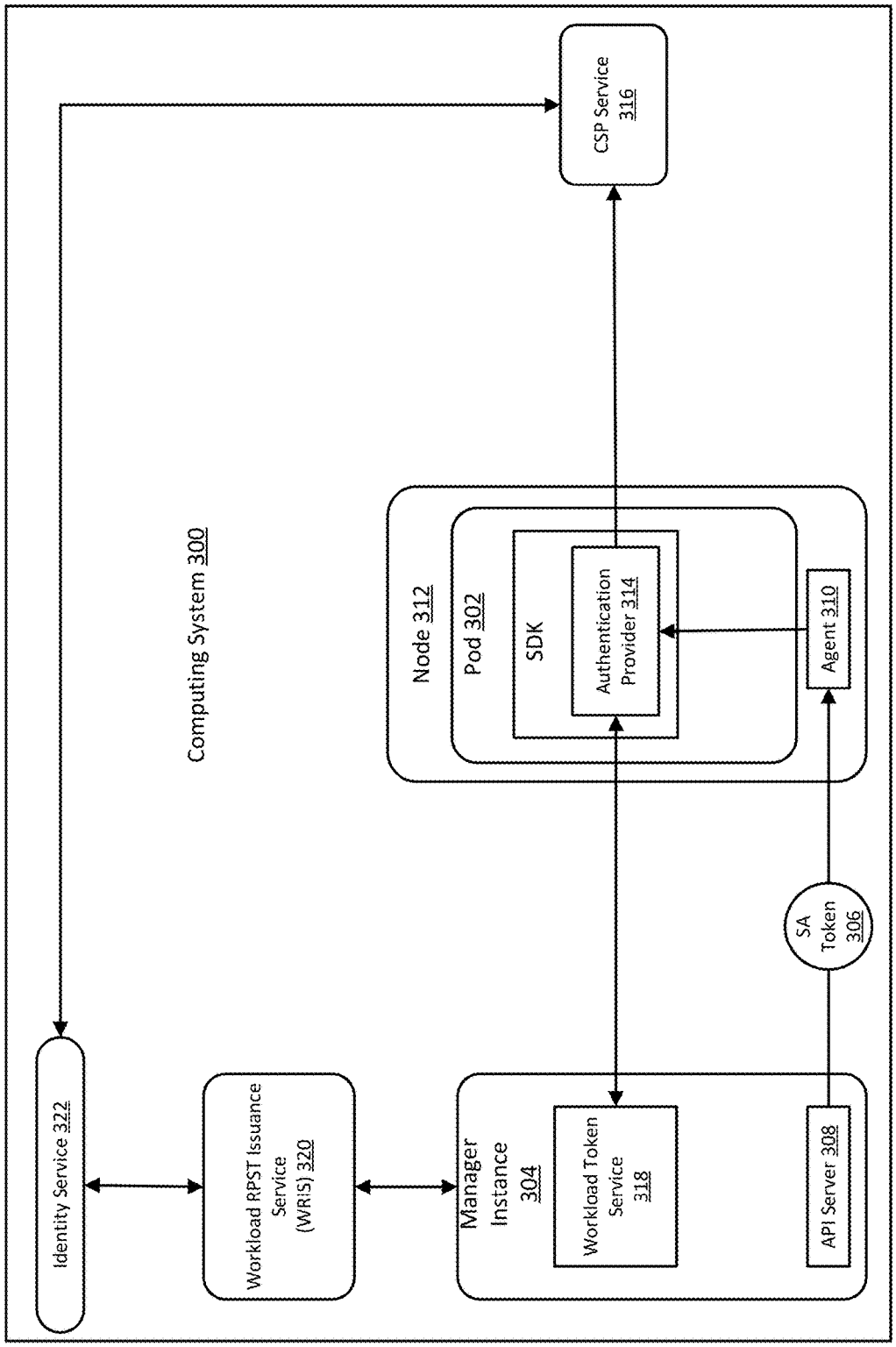
FIG. 3 is an illustration of an example system for authenticating a pod, according to one or more embodiments.

FIG. 3 is an illustration of an example system 300 for authenticating a pod, according to one or more embodiments. A CSP can create a pod 302 to host a CSP customer's code. The pod 302 can be associated with a service account, a namespace, and a cluster. When the pod 302 is created, a manager instance 304 (e.g., a Kubernetes manager instance (KMI)) can generate a service account (SA) token and project the SA token onto the file system of the pod 302. In particular, an API server 308 of the manager instance 304 can generate the SA token 306 and transmit the token to an agent 310 (e.g., a Kubulet) executing on the node 312 that is hosting the pod 302. In addition, the manager instance 304 can further act as the manager node for the customer cluster (e.g., customer cluster 102) associated with a namespace, a service account, and the pod 302.

At some point, the pod 302 may need to use an authentication provider 314 to access a CSP resource 316 to perform some function. The authentication provider 314 can intercept a message (e.g., an API call) indicating that the pod 302 wants to access the CSP resource from a CSP service 316. The authentication provider 314 can access the SA token 306 via the agent 310. The authentication provider 314 can further generate a message including a request for a workload token, and include the SA token 306 in the request. The authentication provider 314 can further include a pod public key (PK). The authentication provider 314 can further sign the request using a pod private key 322 and transmit the message to a workload token service 318 (e.g., Proxymux) that is invoked to process a request from a customer tenancy. The workload token service 318 can authenticate the message from the authentication provider 314 based on the pod public key and the pod signature. In the event that the workload token service 318 is unable to authenticate the message from the authentication provider 314, the process can be discontinued. The authentication can provide the workload token service 318 a level of trust that the authentication provider 314 is managed by the same CSP as the manager instance 304.

The workload token service 318 can then generate and transmit a message to the API server to validate the SA token 306. As the API server 308 created the SA token 306 for the pod 302, the API server 308 can compare the SA token 306 generated for the pod and the SA token received in the request from the authentication provider 314. If the SA tokens match, the API server 308 can authenticate the SA token received from the authentication provider 314. If the tokens do not match, the API server 308 may elect to not authenticate the SA token received from the authentication provider 314.

In the event that the SA token is authenticated, the manager instance 304 can generate a message, including a request for the workload token and the pod public key. The manager instance 304 can further sign the message using a cluster token (e.g., a cluster RPST). The cluster token can be associated with the cluster to which the pod 302 belongs. The manager instance 304 can then transmit the signed message to a workload token issuance service 320. The workload token issuance service 320 can authenticate the request from the manager instance 304 using the cluster token and the pod public key. In some instances, the workload token issuance service 320 may be configured to only communicate with a manager instance associated with a cluster. Therefore, the cluster token can prevent an unwanted entity from communicating with the workload token issuance service 320. For example, the node 312 may not have the cluster token and therefore cannot communicate directly with the workload token issuance service 320. If the workload token issuance service 320 is unable to authenticate the message from the manager instance 304, the process can be discontinued. The authentication of the message can provide a level of trust to the workload token issuance service 320 that the manager instance 304 is managed by the same CSP as the workload token issuance service 320.

In the event that the workload token issuance service 320 authenticates the message, the workload token issuance service 320 can generate a message including the request for the workload token and pod public key. The workload token issuance service 320 can sign the message using a service principal service token (e.g., a Kubernetes service principal service token) (SPST). The workload token issuance service 320 can further transmit the signed message to an identity service 322. Similar to the workload token issuance service 320, the identity service 322 can be configured to only process messages from certain entities. For example, the identity service 322 can be configured to only process a message that has been signed using the SPST. As neither the node 312 nor manager instance 304 have access to the SPST, only the workload token issuance service 320 can communicate directly with the identity service 322. In other words, the node 312 (including the customer cluster) cannot directly transmit a message requesting the workload token to the identity service 322.

The identity service 322 can authenticate the message from the workload token issuance service 320 using the service principal service token and the pod public key. If the identity service 322 is unable to authenticate the message from the workload token issuance service 320, the process can be discontinued. In the event that the message is authenticated, the identity service 322 can issue a workload token for the pod 302. The workload token can indicate which service account, cluster, and namespace the pod 302 is associated with. The workload token can further indicate the policies that apply to each pod bound to the service account. The policy can include, for example, whether the pod 302 can access the CSP resources managed by the CSP service 316. As indicated above, the CSP customer can write policies that cover all pods bound to a workload and the identity service 322 can access the customer's written policy.

The identity service 322 can transmit the workload token to the workload token issuance service 320. The workload token issuance service 320 can transmit the workload token to the manager instance 304, which can in turn transmit the workload token to the authentication provider 314. The authentication provider 314 can generate a message to access the CSP resource (e.g., an API call) that includes the workload token and the pod public key. The authentication provider 314 can sign the message using the pod private key, and transmit the signed message to the CSP service 316 (e.g., an object storage service). The CSP service 316 can communicate with the identity service 320 to verify that the customer policy allows the pod 302 to access the CSP resource.

Figure 4:
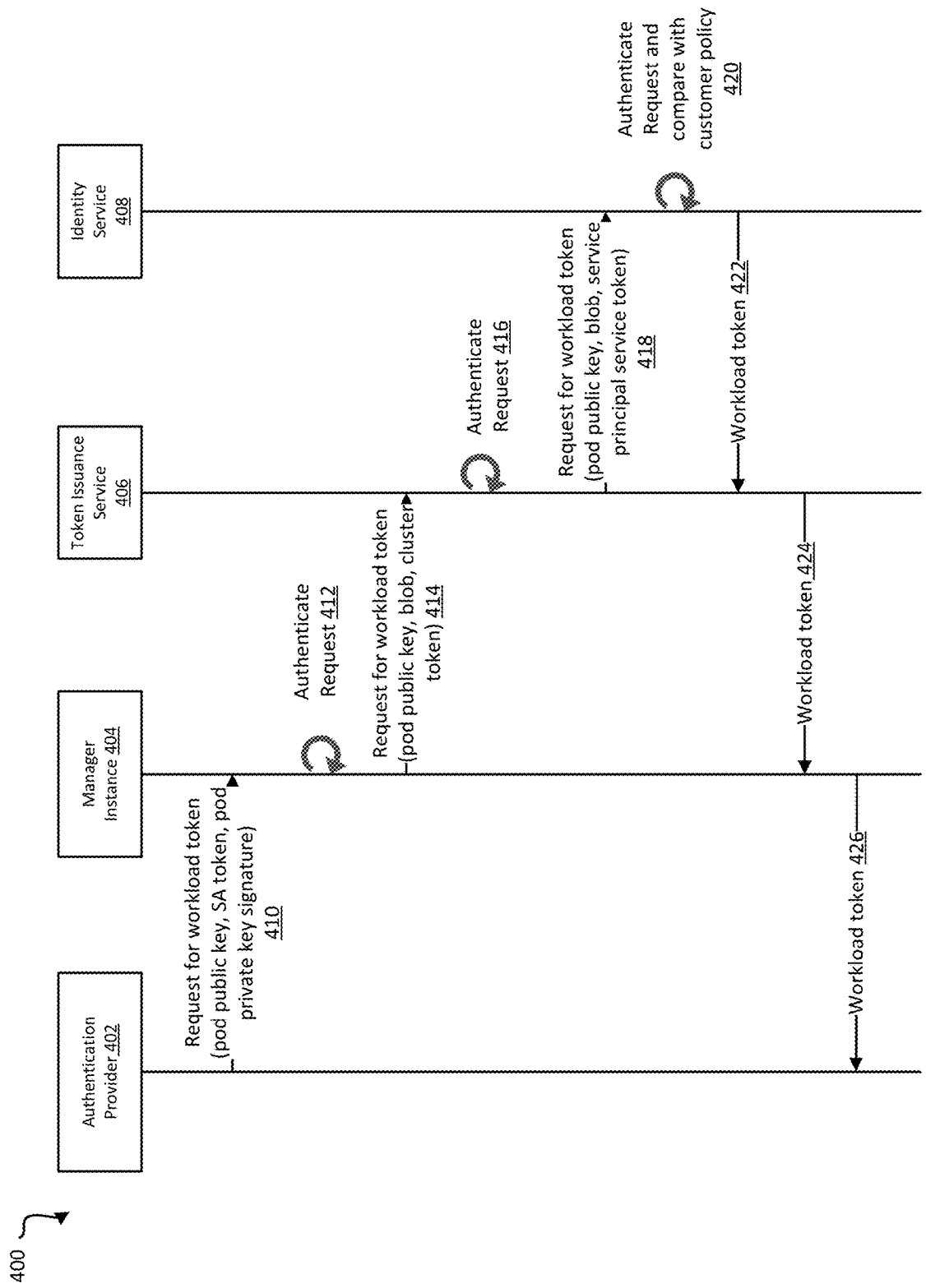
FIG. 4 is a signaling diagram for authenticating a pod, according to one or more embodiments.

FIG. 4 is a signaling diagram for authenticating a pod, according to one or more embodiments. As illustrated, an authentication provider 402 can be in operable communication with a manager instance 404, a token issuance service 406, and an identity service 408. While the operations of processes 400 and 700 are described as being performed by generic computers, it should be understood that any suitable device may be used to perform one or more operations of these processes. Processes 400 and 700 (described below) are respectively illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

At 410, the authentication provider can transmit a request for a workload token to the manager instance 404. For example, a service account can be associated with multiple pods. One of the pods can be associated with an authentication provider 402. At some point, the pod may need to access a CSP resource to perform a function. The pod can transmit an API call to a CSP service that manages the CSP resource. The authentication provider 402 can intercept the API call and determine whether a workload token has been generated for the service account. As indicated above, the authentication provider 402 can request and receive a workload token from a manager instance. The authentication provider 402 can further store any received workload token in memory. In some instances, a workload token can be ephemeral, or in other words expire after some condition has been met. For example, the workload token can expire after the expiration of a timer. In these instances, the authentication provider 402 can further determine whether the workload token is still valid. For example, the authentication provider 402 can determine whether a timer associated with the workload token has expired, or determine whether an expiration time for the workload token has passed. If the authentication provider 402 determines that there is no workload token stored in memory or that the workload token is no longer valid, the authentication provider can transmit a request for a workload token to the manager instance.

The request from the authentication provider can include various security mechanisms, such as a service account token, a pod private key, and a pod private key. The manager instance 404 can create the service account token at the time that the pod is created. The service account token can be stored by an agent of the node hosting the pod. The authentication provider 402 can access the service account token from the agent. The authentication provider 402 can further include the public key in the request. The request can be processed using a cryptographic hash function to generate a hash value (e.g., a fixed-length string of characters). The authentication provider can then encrypt the hash using the pod private key. The authentication provider 402 can further transmit the message, including the digital signature, to the manager instance 404 via a hypertext transfer protocol secure (HTTPS) connection.

At 412, the manager instance 404 can authenticate the request from the authentication provider 402. The manager instance 404 can access the pod public key and decrypt the digital signature, which can reveal a hash value. The manager instance 404 can then use the same cryptographic hash function as the authentication provider 402 to independently generate a hash value. The manager instance 404 can then compare the independently generated has value with the hash value revealed by decrypting the digital signature. If the hash values match, the manager instance can determine that public key used to decrypt the digital signature corresponds to the private key used to generate the digital signature. If the hash values do not match, then the manager instance 404 can discontinue the process.

In the event that the manager instance 404 authenticates the message from the authentication provider 402, the manager instance 404 can generate a request for a workload token to be transmitted to the token issuance service at 414. The request can include the public key. The manager instance 404 can further generate a binary large object ("blob") to be included in the request. The blob can include a varying length binary string that indicates the request for the workload token and information associated with the pod. For example, the blob can include information regarding the service account, the cluster, and the namespace associated with the pod. The manager instance 404 can further use a cluster token to sign the request. For example, the cluster token can include a cluster private key that can be used to sign the request. The cluster token can be associated with a cluster that the manager instances currently manages. In other words, in a scenario that includes multiple manager instances, each manager instance can use a respective cluster token that is associated with that manager instance's cluster (s). The manager instance 404 can then transmit the request, including the digital signature, to the token issuance service 406.

At 416, The token issuance service 406 can authenticate the message from the manager instance 404. The token issuance service 406 can decrypt the digital signature, which can reveal a hash value. The token issuance service 406 can then use the same cryptographic hash function as the manager instance 404 to independently generate a hash value. The token issuance service 406 can then compare the independently generated has value with the hash value revealed by decrypting the digital signature. If the hash values match, the manager instance 404 can determine that public key used to decrypt the digital signature corresponds to the private key used to generate the digital signature. If the hash values do not match, then the token issuance service 406 can discontinue the process.

The token issuance service 406 can be configured to accept direct communication from select entities, including the manager instance 404. The cluster token and the associated private key can be a mechanism to prevent additional entities from directly communicating with the token issuance service. A CSP can manage a multitude of manager instances, and a manager instance can manage an even a greater number of pods. If each pod could directly communicate with the token issuance service 406, the service may become overloaded with messages and unable to function. The herein-described techniques can act as security mechanisms for preventing unknown entities from communicating with the token issuance service. The herein-described techniques can also act as a check of the usage of the token issuance service's resources.

In the event that the token issuance service 406 authenticates the message from the manager instance 404, the token issuance service 406 can generate a request for a workload token to be received by the identity service 408 at 418. The request can include the pod public key, and the blob generated by the manager instance 404. The token issuance service 406 can further sign the message using a service principal service token. The service principal service token can be reserved for entities within the CSP environment on the level of the token issuance service. The identity service 408 can be configured to communicate only with entities that can digitally sign messages with the service principal service token. Similar to the cluster token, use of the service principal service token can prevent an unknown entity from communicating with the identity service 408.

At 420, the identity service 408 can authenticate the message from the token issuance service. The identity service 408 can decrypt the digital signature, which can reveal a hash value. The identity service 408 can then use the same cryptographic hash function as the token issuance service 406 to independently generate a hash value. The identity service 408 can then compare the independently generated has value with the hash value revealed by decrypting the digital signature. If the hash values match, the identity service 408 can determine that public key used to decrypt the digital signature corresponds to the private key used to generate the digital signature. If the hash values do not match, then the identity service 408 can discontinue the process.

The identity service 408 can further analyze the information contained in the blob in view of any policies received from the customer. For example, the customer can write a resource access policy that specifies which CSP resources a service account has permission to access. The identity service 408 can determine the namespace, cluster and service account that the pod belongs to using the information in the blob. The identity service 408 can further determine the identity of the CSP resource that the pod is requesting to access based on the information in the blob. The identity service 408 can determine whether the policy permits the service account and consequently any pod belonging to the service account to access the CSP resource.

If the policy grants the service account access to the CSP resource, the identity service 408 can generate a workload token, which can be used by any pod in the service account to access the CSP resource. Therefore, if another pod associated with the service account wanted to access the CSP resource, the workload token can be used to access the CSP resource by the other pod. If, however, a pod from a different service account wants to access the CSP resource, the workload token would not be effective for accessing the CSP resource. This is due to the workload token being associated with a particular namespace, cluster and service account.

For example, referring back FIG. 1, the authorization provider 402 can intercept an API call between pod A 110 and a service that manages the CSP resource X. Based on intercepting the API call, the authorization provider 402 can transmit a request for a workload token, as described above. Furthermore, the identity service 408 may accept the request and generate a workload token for the first service account 106. The workload token can be used by each of the other pods (e.g., pod B 112 and Pod C 116) to access CSP resource X. however, another pod from another service account (e.g., pod D 118 from the second service account 108) could not use the workload token to access CSP resource X. Furthermore, no pod from either the first service account 106 or the second service account 108 could use the workload token to access another CSP resource (e.g., CSP resource Y).

At 422, the identity service 408 can transmit the workload token to the token issuance service 406. At 424, the token issuance service 406 can transmit the workload token to the manager instance 404. At 426, the manager instance can transmit the workload token to the authentication provider 402.

The authentication provider 402 can transmit the intercepted API call and the workload token to the CSP service that manages the desired CSP resource. The CSP service can communicate directly with the identity service 508 to verify the workload token. Once verified, the pod can access the CSP resource via the CSP service.

FIG. 5 is an illustration of an example policy 500, according to one or more embodiments. The policy can be written by the customer and include a set of rules that govern which CSP resources can support a service account. As illustrated, the policy 500 includes a statement that any user can manage objects in a tenancy where the cluster is "cluster_id," 502 (e.g., cluster 102), the namespace is "namespace," 504 (e.g., cluster 101), and the service account is "service_account" 506 (e.g., the first service account 106).

It can be seen from the illustrated policy 500, that the pod can access a CSP resource as long as the pod belongs to "cluster_id" 502, "namespace" 504, and "service_account" 506. The customer can write policies that cover different service account. for example, if the policy 500 read request.principal.service_account=<service_account2>, the policy may pertain to pods belonging to the second service account 108, rather than the first service account 106.

As indicated above, the identity service can receive a request for a workload token from a token issuance service. In response, the identity service can access the policy 500 and the information in the blob included in the request. The identity service can then determine whether to grant the request based on whether the request is associated with a cluster, namespace, and service account as indicated by the policy. For example, the identity service can compare the cluster, namespace, and service account indicated in the blob with the cluster, namespace, and service account indicated in the policy. If anyone of the cluster, namespace, and service account differ, then the identity service can deny the request. If, however, all three of the cluster, namespace, and service account match, then the identity service can grant the request.

As further indicated above, the workload token may be ephemeral and expire after a condition is met. Therefore, in the event that the identity service receives a second request for a workload token from the token issuance service, the identity service can re-access the policy to determine whether to grant the request. As also indicated above, the customer can write the policy 500. Therefore, it is possible that the customer has written the policy 500 between the first request for a workload token and the second request for a workload token. In other words, whether to grant a request from the same cluster, namespace, and service account is not determined based upon a past decision.

Figure 6:
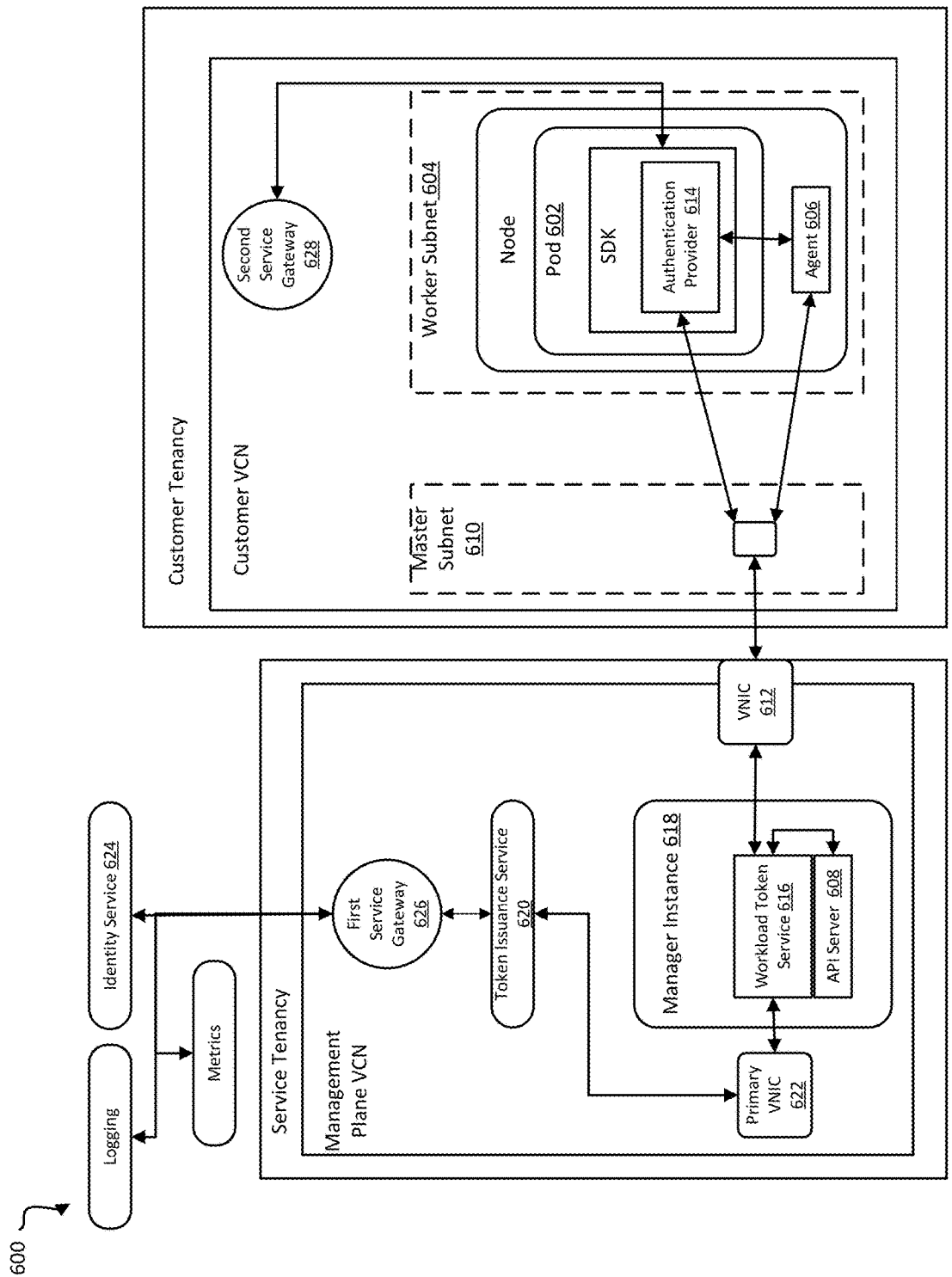
FIG. 6 is an illustration of an example system for authenticating a pod, according to one or more embodiments.

FIG. 6 is an illustration of an example system 600 for authenticating a pod, according to one or more embodiments. The system 600 can be used to generate a pod and to authenticate a pod attempted to access a CSP resource. The CSP can create a pod 602 for a customer to store code. The pod can be stored on a worker sub-network 604 (subnet) that is a portion of a cloud environment responsible for executing customer workloads and applications. In response to the creation of the pod 602, an agent 606 can make an API call to the API server 608 for a service account token. The API call can be made using a secure transmission protocol, such as HTTPS and via a master subnet 610. The master subnet 610 can host a CSP environment control plane and manage coordination between different nodes of the environment. The communication from agent 606 can be routed to a virtual network interface card VNIC 612 that manages access to and from a manager instance 618 associated with the API server 608. The API server 608 can return the service account token to the agent 606. The agent 606 can further make the service account token available to the pod 602.

At some point, the pod 602 may need to access a CSP resource. The pod 602 can make an API call to a CSP service that manages the resource. The authentication provider 614 can intercept the API call. The authentication provider 614 can further transmit a request to the workload token service 616 for a workload token via the VNIC 612. In the request, the authentication provider 614 can include a service account token. The workload token service 616 can send a request to the API server 608 to authenticate the service account token. The API server 608 can authenticate the token and return information as to the cluster, namespace, and service account associated with the service account token. The manager instance 618 can use this information to generate a blob to be transmitted to the token issuance service 620.

The manager instance 618 can transmit a request to the token issuance service 620 via a primary VNIC 622. The request can include the pod public key and the blob. The request can further be signed by the manager instance 618 using a cluster token. The primary VNIC 622 can authenticate the request. The primary VNIC 622 can access the pod public key and decrypt the digital signature, which can reveal a hash value. The primary VNIC 622 can then use the same cryptographic hash function as the manager instance 618 to independently generate a hash value. The primary VNIC 622 can then compare the independently generated has value with the hash value revealed by decrypting the digital signature. If the hash values match, the primary VNIC 622 can determine that public key used to decrypt the digital signature corresponds to the private key used to generate the digital signature. If the hash values do not match, then the primary VNIC 622 can discontinue the process.

The token issuance service 620 can receive the message from the manager instance 618. The token issuance service can generate a request to the identity service 624 via a first service gateway 626. The service gateway 626 can act as an intermediary between the token issuance service and the identity service 624. The request can include the pod public, key, the blob and be signed using a service principal service token. In some instances, the service gateway 626 can authenticate the request from the token issuance service 620. The service gateway 626 can access the pod public key and decrypt the digital signature, which can reveal a hash value. The service gateway 626 can then use the same cryptographic hash function as the token issuance service 620 to independently generate a hash value. The service gateway 626 can then compare the independently generated has value with hash value revealed by decrypting the digital signature. If the hash values match, the service gateway 626 can determine that public key used to decrypt the digital signature corresponds to the private key used to generate the digital signature. If the hash values do not match, then the service gateway 626 can discontinue the process.

The identity service 624 can receive the request from token issuance service 620 via the service gateway 626. The identity service 624 can use the information in the blob to identity policy that cover the pod. The identity service 624 can verify the request against the policy. In the event that the policy permits the pod to access the CSP resource, the identity service 624 can generate a workload token. The identity service 624 can transmit the workload token to the token issuance service 620 via the first service gateway 626. The token issuance service 620 can transmit the workload token to manager instance 618 via the primary VNIC 622. The manager instance 618 can transmit the workload token to the authentication provider 614 via the VNIC 612.

The authentication provider 614 can transmit the intercepted API call and the workload token to a CSP service that manages the desired CSP resource via second service gateway. The CSP service can communicate with the identity service 624 to authenticate the workload token. Upon authentication, the CSP service can permit the pod 602 to access the CSP resource.

Figure 7:
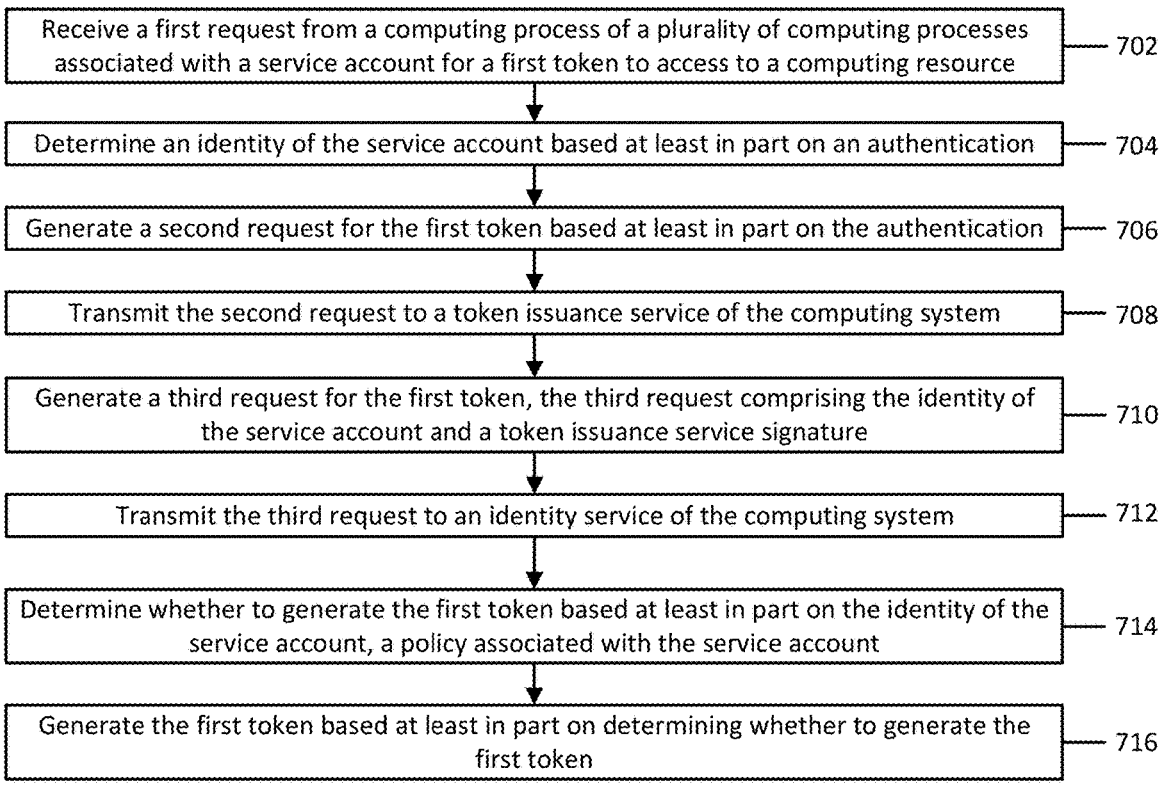
FIG. 7 is a process flow for generation of a workload token, according to one or more embodiments.

FIG. 7 is a process flow 700 for generation of a workload token, according to one or more embodiments. At 702, the method can include a manager instance of a computing system receiving a first request from a computing process (e.g., a pod) of a plurality of computing processes associated with a service account for a first token (e.g., a workload token) to access to a computing resource. The request can include a second token (e.g., an SA token) associated with the computing process.

At 704, the method can include the manager instance of the computing system can determine an identity of the service account based at least in part on an authentication. The cluster, namespace, and service account information can be returned to the workload token service as a blob. The manager instance service determine the service account identity, the cluster identity, and the namespace identity based on the blob.

At 706, the method can include the manager instance of the computing system generating a second request for the first token based at least in part on the authentication. The second request can include a manager instance signature and the identity of the service account.

At 708, the method can include the manager instance of the computing system transmitting the second request to a token issuance service of the computing system.

The token issuance service of the computing system can authenticate the second request based at least in part on the manager instance signature. The token issuance service can decrypt the manager instance signature, which can reveal a hash value. The token issuance service can then use the same cryptographic hash function as the manager instance to independently generate a hash value. The token issuance service can then compare the hash values. If the hash values match, the token issuance service can authenticate the second request.

At 710, the method can include the token issuance service of the computing system generating a third request for the first token, the third request comprising the identity of the service account and a token issuance service signature.

At 712, the method can include the token issuance service of the computing system transmitting the third request to an identity service of the computing system.

The identity service of the computing system can authenticate the third request based at least in part on the token issuance service signature. The identity service can decrypt the token issuance service signature, which can reveal a hash value. The identity service can then use the same cryptographic hash function as the token issuance service to independently generate a hash value. The identity service can then compare the hash values. If the hash values match, the identity service can authenticate the second request.

At 714, the method can include the identity service of the computing system determining whether to generate the first token based at least in part on the identity of the service account, a policy associated with the service account and the authentication.

At 716, the method can include the identity service of the computing system generating the first token based at least in part on determining whether to generate the first token. The identity service can then transmit the first token to the token issuance service. The token issuance service can the transmit the first token to the manager instance. The manager instance can then transmit the first token to the authentication provider.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 8:
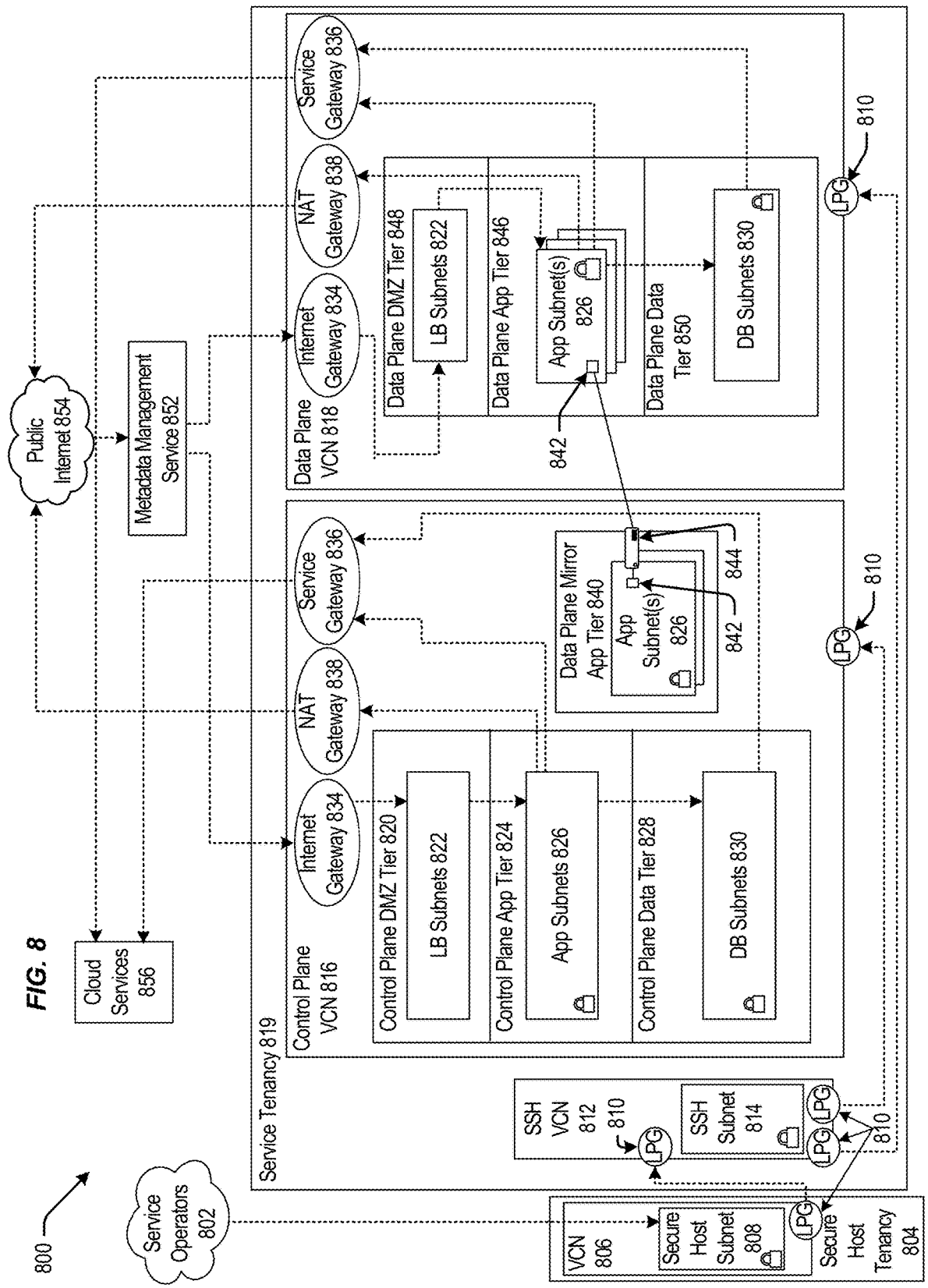
FIG. 8 is a block diagram illustrating one pattern for implementing a cloud infrastructure as a service system, according to at least one embodiment.

FIG. 8 is a block diagram 800 illustrating an example pattern of an IaaS architecture, according to at least one embodiment. Service operators 802 can be communicatively coupled to a secure host tenancy 804 that can include a virtual cloud network (VCN) 806 and a secure host subnet 808. In some examples, the service operators 802 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 806 and/or the Internet.

The VCN 806 can include a local peering gateway (LPG) 810 that can be communicatively coupled to a secure shell (SSH) VCN 812 via an LPG 810 contained in the SSH VCN 812. The SSH VCN 812 can include an SSH subnet 814, and the SSH VCN 812 can be communicatively coupled to a control plane VCN 816 via the LPG 810 contained in the control plane VCN 816. Also, the SSH VCN 812 can be communicatively coupled to a data plane VCN 818 via an LPG 810. The control plane VCN 816 and the data plane VCN 818 can be contained in a service tenancy 819 that can be owned and/or operated by the IaaS provider.

The control plane VCN 816 can include a control plane demilitarized zone (DMZ) tier 820 that acts as a perimeter network (e.g., portions of a corporate network between the corporate intranet and external networks). The DMZ-based servers may have restricted responsibilities and help keep breaches contained. Additionally, the DMZ tier 820 can include one or more load balancer (LB) subnet(s) 822, a control plane app tier 824 that can include app subnet(s) 826, a control plane data tier 828 that can include database (DB) subnet(s) 830 (e.g., frontend DB subnet(s) and/or backend DB subnet(s)). The LB subnet(s) 822 contained in the control plane DMZ tier 820 can be communicatively coupled to the app subnet(s) 826 contained in the control plane app tier 824 and an Internet gateway 834 that can be contained in the control plane VCN 816, and the app subnet(s) 826 can be communicatively coupled to the DB subnet(s) 830 contained in the control plane data tier 828 and a service gateway 836 and a network address translation (NAT) gateway 838. The control plane VCN 816 can include the service gateway 836 and the NAT gateway 838.

The control plane VCN 816 can include a data plane mirror app tier 840 that can include app subnet(s) 826. The app subnet(s) 826 contained in the data plane mirror app tier 840 can include a virtual network interface controller (VNIC) 842 that can execute a compute instance 844. The compute instance 844 can communicatively couple the app subnet(s) 826 of the data plane mirror app tier 840 to app subnet(s) 826 that can be contained in a data plane app tier 846.

The data plane VCN 818 can include the data plane app tier 846, a data plane DMZ tier 848, and a data plane data tier 850. The data plane DMZ tier 848 can include LB subnet(s) 822 that can be communicatively coupled to the app subnet(s) 826 of the data plane app tier 846 and the Internet gateway 834 of the data plane VCN 818. The app subnet(s) 826 can be communicatively coupled to the service gateway 836 of the data plane VCN 818 and the NAT gateway 838 of the data plane VCN 818. The data plane data tier 850 can also include the DB subnet(s) 830 that can be communicatively coupled to the app subnet(s) 826 of the data plane app tier 846.

The Internet gateway 834 of the control plane VCN 816 and of the data plane VCN 818 can be communicatively coupled to a metadata management service 852 that can be communicatively coupled to public Internet 854. Public Internet 854 can be communicatively coupled to the NAT gateway 838 of the control plane VCN 816 and of the data plane VCN 818. The service gateway 836 of the control plane VCN 816 and of the data plane VCN 818 can be communicatively coupled to cloud services 856.

In some examples, the service gateway 836 of the control plane VCN 816 or of the data plane VCN 818 can make application programming interface (API) calls to cloud services 856 without going through public Internet 854. The API calls to cloud services 856 from the service gateway 836 can be one-way: the service gateway 836 can make API calls to cloud services 856, and cloud services 856 can send requested data to the service gateway 836. But, cloud services 856 may not initiate API calls to the service gateway 836.

In some examples, the secure host tenancy 804 can be directly connected to the service tenancy 819, which may be otherwise isolated. The secure host subnet 808 can communicate with the SSH subnet 814 through an LPG 810 that may enable two-way communication over an otherwise isolated system. Connecting the secure host subnet 808 to the SSH subnet 814 may give the secure host subnet 808 access to other entities within the service tenancy 819.

The control plane VCN 816 may allow users of the service tenancy 819 to set up or otherwise provision desired resources. Desired resources provisioned in the control plane VCN 816 may be deployed or otherwise used in the data plane VCN 818. In some examples, the control plane VCN 816 can be isolated from the data plane VCN 818, and the data plane mirror app tier 840 of the control plane VCN 816 can communicate with the data plane app tier 846 of the data plane VCN 818 via VNICs 842 that can be contained in the data plane mirror app tier 840 and the data plane app tier 846.

In some examples, users of the system, or customers, can make requests, for example create, read, update, or delete (CRUD) operations, through public Internet 854 that can communicate the requests to the metadata management service 852. The metadata management service 852 can communicate the request to the control plane VCN 816 through the Internet gateway 834. The request can be received by the LB subnet(s) 822 contained in the control plane DMZ tier 820. The LB subnet(s) 822 may determine that the request is valid, and in response to this determination, the LB subnet(s) 822 can transmit the request to app subnet(s) 826 contained in the control plane app tier 824. If the request is validated and requires a call to public Internet 854, the call to public Internet 854 may be transmitted to the NAT gateway 838 that can make the call to public Internet 854. Metadata that may be desired to be stored by the request can be stored in the DB subnet(s) 830.

In some examples, the data plane mirror app tier 840 can facilitate direct communication between the control plane VCN 816 and the data plane VCN 818. For example, changes, updates, or other suitable modifications to configuration may be desired to be applied to the resources contained in the data plane VCN 818. Via a VNIC 842, the control plane VCN 816 can directly communicate with, and can thereby execute the changes, updates, or other suitable modifications to configuration to, resources contained in the data plane VCN 818.

In some embodiments, the control plane VCN 816 and the data plane VCN 818 can be contained in the service tenancy 819. In this case, the user, or the customer, of the system may not own or operate either the control plane VCN 816 or the data plane VCN 818. Instead, the IaaS provider may own or operate the control plane VCN 816 and the data plane VCN 818, both of which may be contained in the service tenancy 819. This embodiment can enable isolation of networks that may prevent users or customers from interacting with other users', or other customers', resources. Also, this embodiment may allow users or customers of the system to store databases privately without needing to rely on public Internet 854, which may not have a desired level of threat prevention, for storage.

In other embodiments, the LB subnet(s) 822 contained in the control plane VCN 816 can be configured to receive a signal from the service gateway 836. In this embodiment, the control plane VCN 816 and the data plane VCN 818 may be configured to be called by a customer of the IaaS provider without calling public Internet 854. Customers of the IaaS provider may desire this embodiment since database(s) that the customers use may be controlled by the IaaS provider and may be stored on the service tenancy 819, which may be isolated from public Internet 854.

Figure 9:
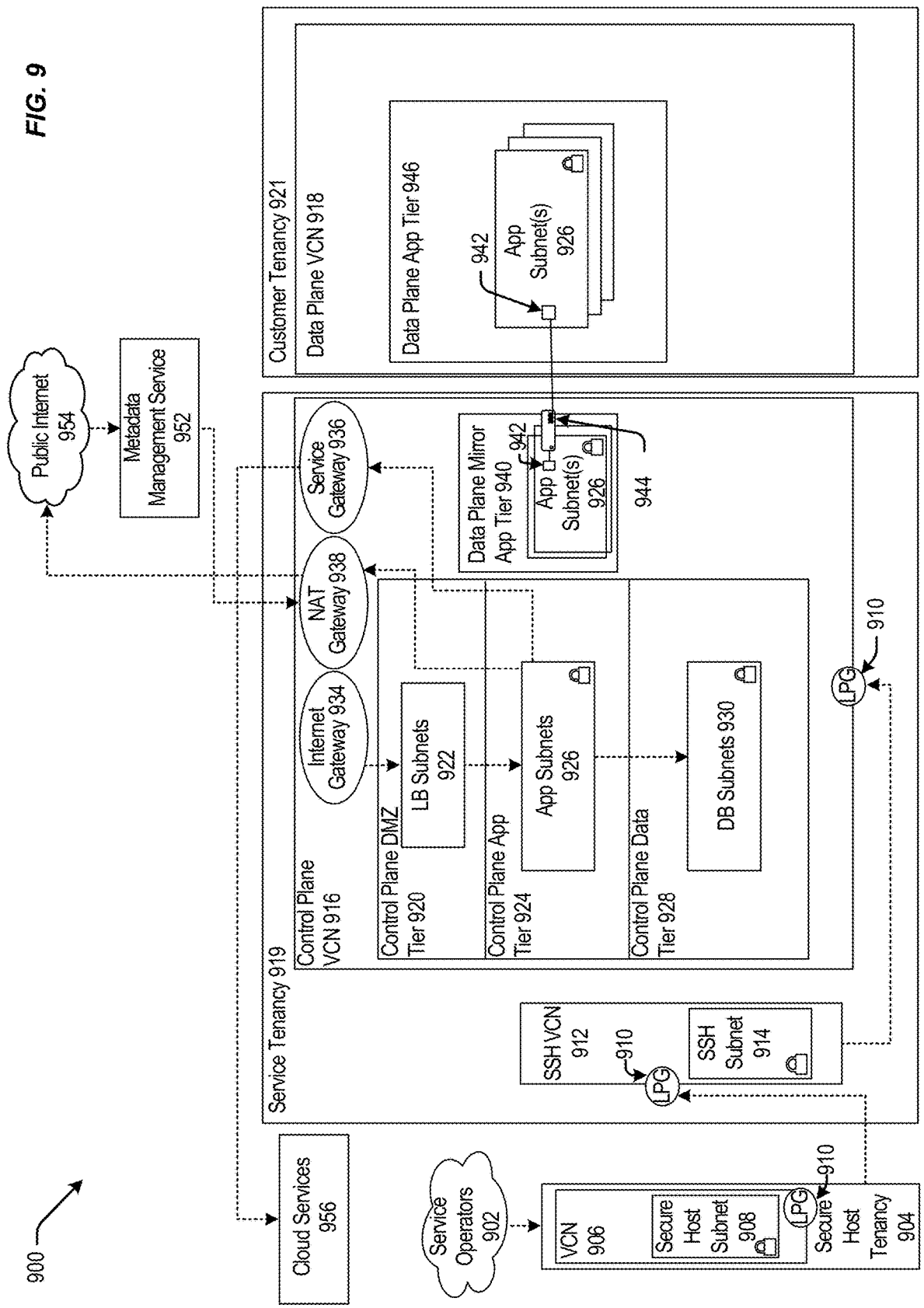
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g., service operators 802 of FIG. 8) can be communicatively coupled to a secure host tenancy 904 (e.g., the secure host tenancy 804 of FIG. 8) that can include a virtual cloud network (VCN) 906 (e.g., the VCN 806 of FIG. 8) and a secure host subnet 908 (e.g., the secure host subnet 808 of FIG. 8). The VCN 906 can include a local peering gateway (LPG) 910 (e.g., the LPG 810 of FIG. 8) that can be communicatively coupled to a secure shell (SSH) VCN 912 (e.g., the SSH VCN 812 of FIG. 8) via an LPG 810 contained in the SSH VCN 912. The SSH VCN 912 can include an SSH subnet 914 (e.g., the SSH subnet 814 of FIG. 8), and the SSH VCN 912 can be communicatively coupled to a control plane VCN 916 (e.g., the control plane VCN 816 of FIG. 8) via an LPG 910 contained in the control plane VCN 916. The control plane VCN 916 can be contained in a service tenancy 919 (e.g., the service tenancy 819 of FIG. 8), and the data plane VCN 918 (e.g., the data plane VCN 818 of FIG. 8) can be contained in a customer tenancy 921 that may be owned or operated by users, or customers, of the system.

The control plane VCN 916 can include a control plane DMZ tier 920 (e.g., the control plane DMZ tier 820 of FIG. 8) that can include LB subnet(s) 922 (e.g., LB subnet(s) 822 of FIG. 8), a control plane app tier 924 (e.g., the control plane app tier 824 of FIG. 8) that can include app subnet(s) 926 (e.g., app subnet(s) 826 of FIG. 8), a control plane data tier 928 (e.g., the control plane data tier 828 of FIG. 8) that can include database (DB) subnet(s) 930 (e.g., similar to DB subnet(s) 830 of FIG. 8). The LB subnet(s) 922 contained in the control plane DMZ tier 920 can be communicatively coupled to the app subnet(s) 926 contained in the control plane app tier 924 and an Internet gateway 934 (e.g., the Internet gateway 834 of FIG. 8) that can be contained in the control plane VCN 916, and the app subnet(s) 926 can be communicatively coupled to the DB subnet(s) 930 contained in the control plane data tier 928 and a service gateway 936 (e.g., the service gateway 836 of FIG. 8) and a network address translation (NAT) gateway 938 (e.g., the NAT gateway 838 of FIG. 8). The control plane VCN 916 can include the service gateway 936 and the NAT gateway 938.

The control plane VCN 916 can include a data plane mirror app tier 940 (e.g., the data plane mirror app tier 840 of FIG. 8) that can include app subnet(s) 926. The app subnet(s) 926 contained in the data plane mirror app tier 940 can include a virtual network interface controller (VNIC) 942 (e.g., the VNIC of 842) that can execute a compute instance 944 (e.g., similar to the compute instance 844 of FIG. 8). The compute instance 944 can facilitate communication between the app subnet(s) 926 of the data plane mirror app tier 940 and the app subnet(s) 926 that can be contained in a data plane app tier 946 (e.g., the data plane app tier 846 of FIG. 8) via the VNIC 942 contained in the data plane mirror app tier 940 and the VNIC 942 contained in the data plane app tier 946.

The Internet gateway 934 contained in the control plane VCN 916 can be communicatively coupled to a metadata management service 952 (e.g., the metadata management service 852 of FIG. 8) that can be communicatively coupled to public Internet 954 (e.g., public Internet 854 of FIG. 8). Public Internet 954 can be communicatively coupled to the NAT gateway 938 contained in the control plane VCN 916. The service gateway 936 contained in the control plane VCN 916 can be communicatively coupled to cloud services 956 (e.g., cloud services 856 of FIG. 8).

In some examples, the data plane VCN 918 can be contained in the customer tenancy 921. In this case, the IaaS provider may provide the control plane VCN 916 for each customer, and the IaaS provider may, for each customer, set up a unique compute instance 944 that is contained in the service tenancy 919. Each compute instance 944 may allow communication between the control plane VCN 916, contained in the service tenancy 919, and the data plane VCN 918 that is contained in the customer tenancy 921. The compute instance 944 may allow resources, that are provisioned in the control plane VCN 916 that is contained in the service tenancy 919, to be deployed or otherwise used in the data plane VCN 918 that is contained in the customer tenancy 921.

In other examples, the customer of the IaaS provider may have databases that live in the customer tenancy 921. In this example, the control plane VCN 916 can include the data plane mirror app tier 940 that can include app subnet(s) 926. The data plane mirror app tier 940 can reside in the data plane VCN 918, but the data plane mirror app tier 940 may not live in the data plane VCN 918. That is, the data plane mirror app tier 940 may have access to the customer tenancy 921, but the data plane mirror app tier 940 may not exist in the data plane VCN 918 or be owned or operated by the customer of the IaaS provider. The data plane mirror app tier 940 may be configured to make calls to the data plane VCN 918 but may not be configured to make calls to any entity contained in the control plane VCN 916. The customer may desire to deploy or otherwise use resources in the data plane VCN 918 that are provisioned in the control plane VCN 916, and the data plane mirror app tier 940 can facilitate the desired deployment, or other usage of resources, of the customer.

In some embodiments, the customer of the IaaS provider can apply filters to the data plane VCN 918. In this embodiment, the customer can determine what the data plane VCN 918 can access, and the customer may restrict access to public Internet 954 from the data plane VCN 918. The IaaS provider may not be able to apply filters or otherwise control access of the data plane VCN 918 to any outside networks or databases. Applying filters and controls by the customer onto the data plane VCN 918, contained in the customer tenancy 921, can help isolate the data plane VCN 918 from other customers and from public Internet 954.

In some embodiments, cloud services 956 can be called by the service gateway 936 to access services that may not exist on public Internet 954, on the control plane VCN 916, or on the data plane VCN 918. The connection between cloud services 956 and the control plane VCN 916 or the data plane VCN 918 may not be live or continuous. Cloud services 956 may exist on a different network owned or operated by the IaaS provider. Cloud services 956 may be configured to receive calls from the service gateway 936 and may be configured to not receive calls from public Internet 954. Some cloud services 956 may be isolated from other cloud services 956, and the control plane VCN 916 may be isolated from cloud services 956 that may not be in the same region as the control plane VCN 916. For example, the control plane VCN 916 may be located in "Region 1," and cloud service "Deployment 8," may be located in Region 1 and in "Region 2." If a call to Deployment 8 is made by the service gateway 936 contained in the control plane VCN 916 located in Region 1, the call may be transmitted to Deployment 8 in Region 1. In this example, the control plane VCN 916, or Deployment 8 in Region 1, may not be communicatively coupled to, or otherwise in communication with, Deployment 8 in Region 2.

Figure 10:
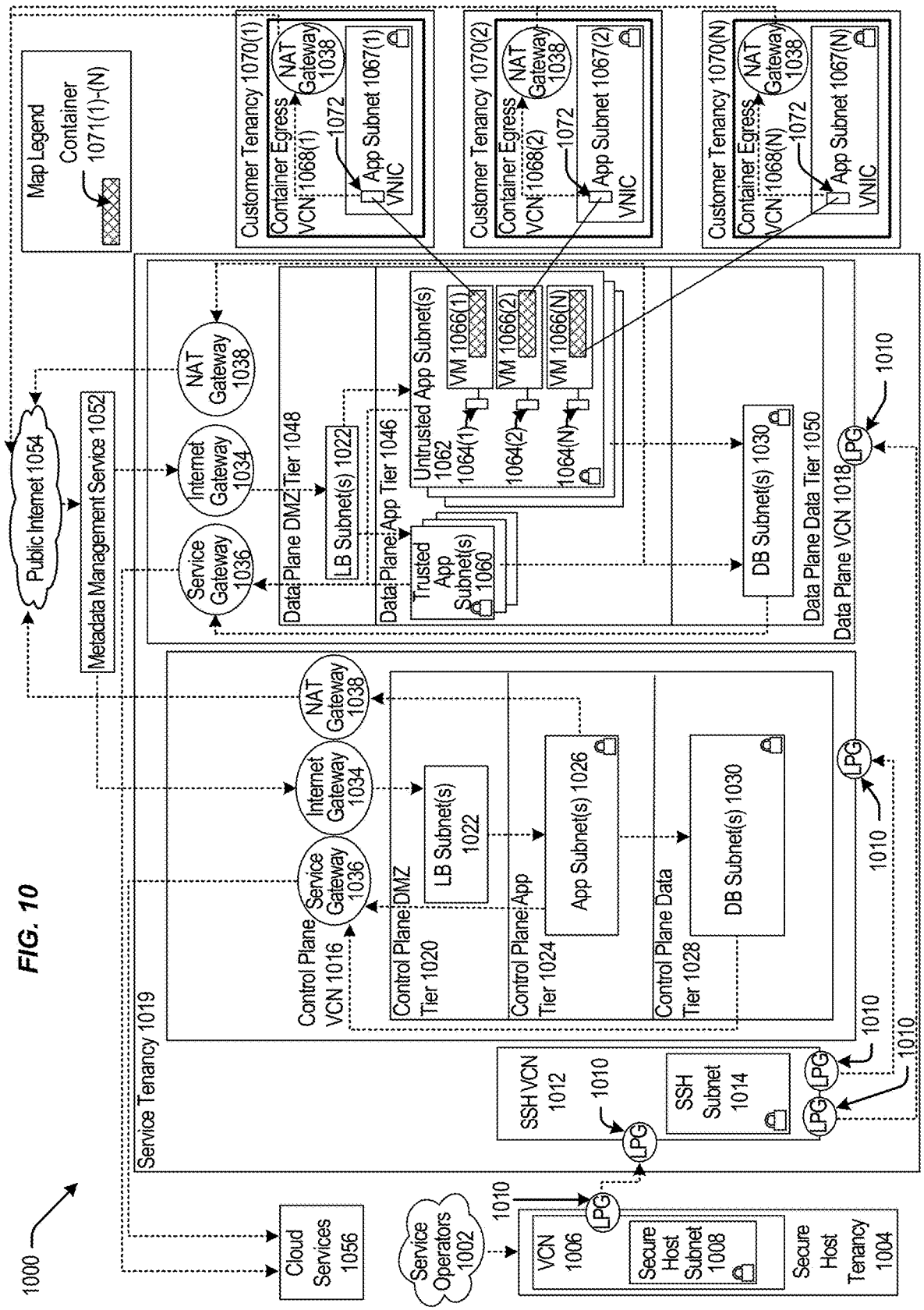
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g., service operators 802 of FIG. 8) can be communicatively coupled to a secure host tenancy 1004 (e.g., the secure host tenancy 804 of FIG. 8) that can include a virtual cloud network (VCN) 1006 (e.g., the VCN 806 of FIG. 8) and a secure host subnet 1008 (e.g., the secure host subnet 808 of FIG. 8). The VCN 1006 can include an LPG 1010 (e.g., the LPG 810 of FIG. 8) that can be communicatively coupled to an SSH VCN 1012 (e.g., the SSH VCN 812 of FIG. 8) via an LPG 1010 contained in the SSH VCN 1012. The SSH VCN 1012 can include an SSH subnet 1014 (e.g., the SSH subnet 814 of FIG. 8), and the SSH VCN 1012 can be communicatively coupled to a control plane VCN 1016 (e.g., the control plane VCN 816 of FIG. 8) via an LPG 1010 contained in the control plane VCN 1016 and to a data plane VCN 1018 (e.g., the data plane 818 of FIG. 8) via an LPG 1010 contained in the data plane VCN 1018. The control plane VCN 1016 and the data plane VCN 1018 can be contained in a service tenancy 1019 (e.g., the service tenancy 819 of FIG. 8).

The control plane VCN 1016 can include a control plane DMZ tier 1020 (e.g., the control plane DMZ tier 820 of FIG. 8) that can include load balancer (LB) subnet(s) 1022 (e.g., LB subnet(s) 822 of FIG. 8), a control plane app tier 1024 (e.g., the control plane app tier 824 of FIG. 8) that can include app subnet(s) 1026 (e.g., similar to app subnet(s) 826 of FIG. 8), a control plane data tier 1028 (e.g., the control plane data tier 828 of FIG. 8) that can include DB subnet(s) 1030. The LB subnet(s) 1022 contained in the control plane DMZ tier 1020 can be communicatively coupled to the app subnet(s) 1026 contained in the control plane app tier 1024 and to an Internet gateway 1034 (e.g., the Internet gateway 834 of FIG. 8) that can be contained in the control plane VCN 1016, and the app subnet(s) 1026 can be communicatively coupled to the DB subnet(s) 1030 contained in the control plane data tier 1028 and to a service gateway 1036 (e.g., the service gateway of FIG. 8) and a network address translation (NAT) gateway 1038 (e.g., the NAT gateway 838 of FIG. 8). The control plane VCN 1016 can include the service gateway 1036 and the NAT gateway 1038.

The data plane VCN 1018 can include a data plane app tier 1046 (e.g., the data plane app tier 846 of FIG. 8), a data plane DMZ tier 1048 (e.g., the data plane DMZ tier 848 of FIG. 8), and a data plane data tier 1050 (e.g., the data plane data tier 850 of FIG. 8). The data plane DMZ tier 1048 can include LB subnet(s) 1022 that can be communicatively coupled to trusted app subnet(s) 1060 and untrusted app subnet(s) 1062 of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include one or more primary VNICs 1064(1)-(N) that can be communicatively coupled to tenant virtual machines (VMs) 1066(1)-(N). Each tenant VM 1066(1)-(N) can be communicatively coupled to a respective app subnet 1067(1)-(N) that can be contained in respective container egress VCNs 1068(1)-(N) that can be contained in respective customer tenancies 1070(1)-(N). Respective secondary VNICs 1072(1)-(N) can facilitate communication between the untrusted app subnet(s) 1062 contained in the data plane VCN 1018 and the app subnet contained in the container egress VCNs 1068(1)-(N). Each container egress VCNs 1068(1)-(N) can include a NAT gateway 1038 that can be communicatively coupled to public Internet 1054 (e.g., public Internet 854 of FIG. 8).

The Internet gateway 1034 contained in the control plane VCN 1016 and contained in the data plane VCN 1018 can be communicatively coupled to a metadata management service 1052 (e.g., the metadata management system 852 of FIG. 8) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively coupled to cloud services 1056.

In some embodiments, the data plane VCN 1018 can be integrated with customer tenancies 1070. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1046. Code to run the function may be executed in the VMs 1066(1)-(N), and the code may not be configured to run anywhere else on the data plane VCN 1018. Each VM 1066(1)-(N) may be connected to one customer tenancy 1070. Respective containers 1071(1)-(N) contained in the VMs 1066(1)-(N) may be configured to run the code. In this case, there can be a dual isolation (e.g., the containers 1071(1)-(N) running code, where the containers 1071(1)-(N) may be contained in at least the VM 1066(1)-(N) that are contained in the untrusted app subnet(s) 1062), which may help prevent incorrect or otherwise undesirable code from damaging the network of the IaaS provider or from damaging a network of a different customer. The containers 1071(1)-(N) may be communicatively coupled to the customer tenancy 1070 and may be configured to transmit or receive data from the customer tenancy 1070. The containers 1071(1)-(N) may not be configured to transmit or receive data from any other entity in the data plane VCN 1018. Upon completion of running the code, the IaaS provider may kill or otherwise dispose of the containers 1071(1)-(N).

In some embodiments, the trusted app subnet(s) 1060 may run code that may be owned or operated by the IaaS provider. In this embodiment, the trusted app subnet(s) 1060 may be communicatively coupled to the DB subnet(s) 1030 and be configured to execute CRUD operations in the DB subnet(s) 1030. The untrusted app subnet(s) 1062 may be communicatively coupled to the DB subnet(s) 1030, but in this embodiment, the untrusted app subnet(s) may be configured to execute read operations in the DB subnet(s) 1030. The containers 1071(1)-(N) that can be contained in the VM 1066(1)-(N) of each customer and that may run code from the customer may not be communicatively coupled with the DB subnet(s) 1030.

In other embodiments, the control plane VCN 1016 and the data plane VCN 1018 may not be directly communicatively coupled. In this embodiment, there may be no direct communication between the control plane VCN 1016 and the data plane VCN 1018. However, communication can occur indirectly through at least one method. An LPG 1010 may be established by the IaaS provider that can facilitate communication between the control plane VCN 1016 and the data plane VCN 1018. In another example, the control plane VCN 1016 or the data plane VCN 1018 can make a call to cloud services 1056 via the service gateway 1036. For example, a call to cloud services 1056 from the control plane VCN 1016 can include a request for a service that can communicate with the data plane VCN 1018.

Figure 11:
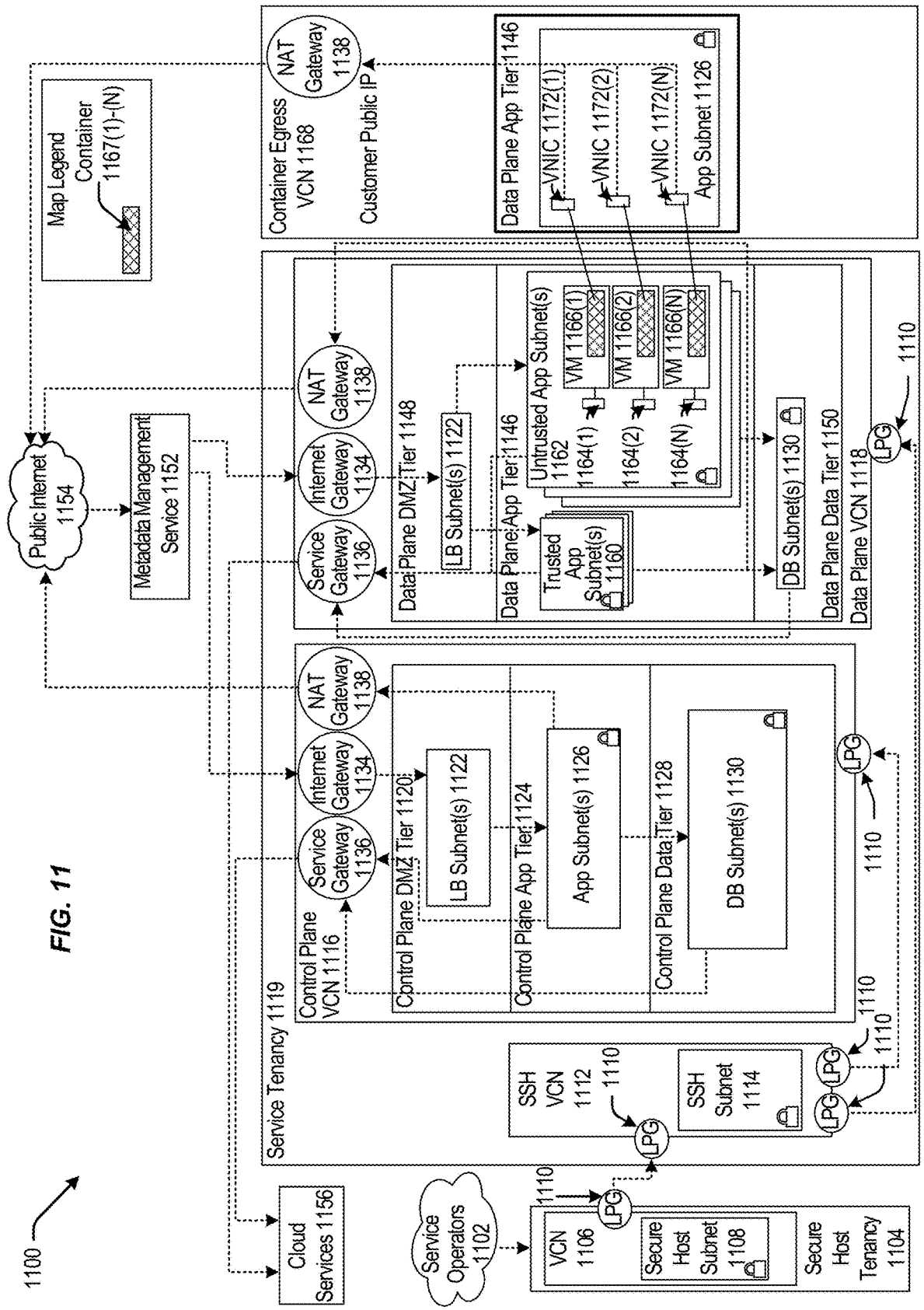
FIG. 11 is a block diagram illustrating another pattern for implementing a cloud infrastructure as a service system, according to at least one embodiment.

FIG. 11 is a block diagram 1100 illustrating another example pattern of an IaaS architecture, according to at least one embodiment. Service operators 1102 (e.g., service operators 802 of FIG. 8) can be communicatively coupled to a secure host tenancy 1104 (e.g., the secure host tenancy 804 of FIG. 8) that can include a virtual cloud network (VCN) 1106 (e.g., the VCN 806 of FIG. 8) and a secure host subnet 1108 (e.g., the secure host subnet 808 of FIG. 8). The VCN 1106 can include an LPG 1110 (e.g., the LPG 810 of FIG. 8) that can be communicatively coupled to an SSH VCN 1112 (e.g., the SSH VCN 812 of FIG. 8) via an LPG 1110 contained in the SSH VCN 1112. The SSH VCN 1112 can include an SSH subnet 1114 (e.g., the SSH subnet 814 of FIG. 8), and the SSH VCN 1112 can be communicatively coupled to a control plane VCN 1116 (e.g., the control plane VCN 816 of FIG. 8) via an LPG 1110 contained in the control plane VCN 1116 and to a data plane VCN 1118 (e.g., the data plane 818 of FIG. 8) via an LPG 1110 contained in the data plane VCN 1118. The control plane VCN 1116 and the data plane VCN 1118 can be contained in a service tenancy 1119 (e.g., the service tenancy 819 of FIG. 8).

The control plane VCN 1116 can include a control plane DMZ tier 1120 (e.g., the control plane DMZ tier 820 of FIG. 8) that can include LB subnet(s) 1122 (e.g., LB subnet(s) 822 of FIG. 8), a control plane app tier 1124 (e.g., the control plane app tier 824 of FIG. 8) that can include app subnet(s) 1126 (e.g., app subnet(s) 826 of FIG. 8), a control plane data tier 1128 (e.g., the control plane data tier 828 of FIG. 8) that can include DB subnet(s) 1130 (e.g., DB subnet(s) 1030 of FIG. 10). The LB subnet(s) 1122 contained in the control plane DMZ tier 1120 can be communicatively coupled to the app subnet(s) 1126 contained in the control plane app tier 1124 and to an Internet gateway 1134 (e.g., the Internet gateway 834 of FIG. 8) that can be contained in the control plane VCN 1116, and the app subnet(s) 1126 can be communicatively coupled to the DB subnet(s) 1130 contained in the control plane data tier 1128 and to a service gateway 1136 (e.g., the service gateway of FIG. 8) and a network address translation (NAT) gateway 1138 (e.g., the NAT gateway 838 of FIG. 8). The control plane VCN 1116 can include the service gateway 1136 and the NAT gateway 1138.

The data plane VCN 1118 can include a data plane app tier 1146 (e.g., the data plane app tier 846 of FIG. 8), a data plane DMZ tier 1148 (e.g., the data plane DMZ tier 848 of FIG. 8), and a data plane data tier 1150 (e.g., the data plane data tier 850 of FIG. 8). The data plane DMZ tier 1148 can include LB subnet(s) 1122 that can be communicatively coupled to trusted app subnet(s) 1160 (e.g., trusted app subnet(s) 1060 of FIG. 10) and untrusted app subnet(s) 1162 (e.g., untrusted app subnet(s) 1062 of FIG. 10) of the data plane app tier 1146 and the Internet gateway 1134 contained in the data plane VCN 1118. The trusted app subnet(s) 1160 can be communicatively coupled to the service gateway 1136 contained in the data plane VCN 1118, the NAT gateway 1138 contained in the data plane VCN 1118, and DB subnet(s) 1130 contained in the data plane data tier 1150. The untrusted app subnet(s) 1162 can be communicatively coupled to the service gateway 1136 contained in the data plane VCN 1118 and DB subnet(s) 1130 contained in the data plane data tier 1150. The data plane data tier 1150 can include DB subnet(s) 1130 that can be communicatively coupled to the service gateway 1136 contained in the data plane VCN 1118.

The untrusted app subnet(s) 1162 can include primary VNICs 1164(1)-(N) that can be communicatively coupled to tenant virtual machines (VMs) 1166(1)-(N) residing within the untrusted app subnet(s) 1162. Each tenant VM 1166(1)-(N) can run code in a respective container 1167(1)-(N), and be communicatively coupled to an app subnet 1126 that can be contained in a data plane app tier 1146 that can be contained in a container egress VCN 1168. Respective secondary VNICs 1172(1)-(N) can facilitate communication between the untrusted app subnet(s) 1162 contained in the data plane VCN 1118 and the app subnet contained in the container egress VCN 1168. The container egress VCN can include a NAT gateway 1138 that can be communicatively coupled to public Internet 1154 (e.g., public Internet 854 of FIG. 8).

The Internet gateway 1134 contained in the control plane VCN 1116 and contained in the data plane VCN 1118 can be communicatively coupled to a metadata management service 1152 (e.g., the metadata management system 852 of FIG. 8) that can be communicatively coupled to public Internet 1154. Public Internet 1154 can be communicatively coupled to the NAT gateway 1138 contained in the control plane VCN 1116 and contained in the data plane VCN 1118. The service gateway 1136 contained in the control plane VCN 1116 and contained in the data plane VCN 1118 can be communicatively coupled to cloud services 1156.

In some examples, the pattern illustrated by the architecture of block diagram 1100 of FIG. 11 may be considered an exception to the pattern illustrated by the architecture of block diagram 1000 of FIG. 10 and may be desirable for a customer of the IaaS provider if the IaaS provider cannot directly communicate with the customer (e.g., a disconnected region). The respective containers 1167(1)-(N) that are contained in the VMs 1166(1)-(N) for each customer can be accessed in real-time by the customer. The containers 1167(1)-(N) may be configured to make calls to respective secondary VNICs 1172(1)-(N) contained in app subnet(s) 1126 of the data plane app tier 1146 that can be contained in the container egress VCN 1168. The secondary VNICs 1172(1)-(N) can transmit the calls to the NAT gateway 1138 that may transmit the calls to public Internet 1154. In this example, the containers 1167(1)-(N) that can be accessed in real-time by the customer can be isolated from the control plane VCN 1116 and can be isolated from other entities contained in the data plane VCN 1118. The containers 1167(1)-(N) may also be isolated from resources from other customers.

In other examples, the customer can use the containers 1167(1)-(N) to call cloud services 1156. In this example, the customer may run code in the containers 1167(1)-(N) that requests a service from cloud services 1156. The containers 1167(1)-(N) can transmit this request to the secondary VNICs 1172(1)-(N) that can transmit the request to the NAT gateway that can transmit the request to public Internet 1154. Public Internet 1154 can transmit the request to LB subnet(s) 1122 contained in the control plane VCN 1116 via the Internet gateway 1134. In response to determining the request is valid, the LB subnet(s) can transmit the request to app subnet(s) 1126 that can transmit the request to cloud services 1156 via the service gateway 1136.

It should be appreciated that IaaS architectures 800, 900, 1000, 1100 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 12:
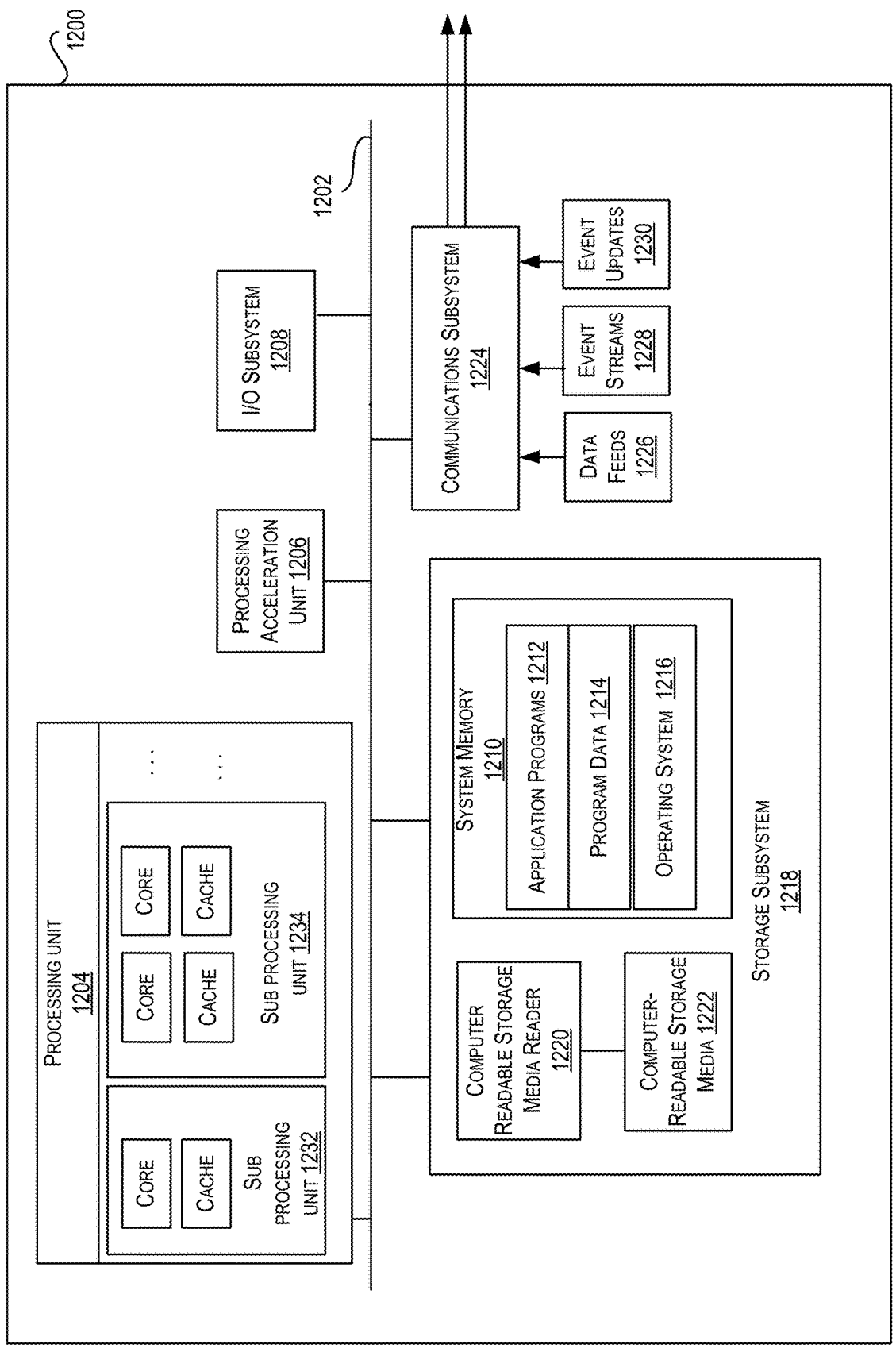
FIG. 12 is a block diagram illustrating an example computer system, according to at least one embodiment.

FIG. 12 illustrates an example computer system 1200, in which various embodiments may be implemented. The system 1200 may be used to implement any of the computer systems described above. As shown in the figure, computer system 1200 includes a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 includes tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some or all of the program code to be executed can be resident in processor(s) 1204 and/or in storage subsystem 1218. Through suitable programming, processor(s) 1204 can provide various functionalities described above. Computer system 1200 may additionally include a processing acceleration unit 1206, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1200 may comprise a storage subsystem 1218 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 1204 provide the functionality described above. Storage subsystem 1218 may also provide a repository for storing data used in accordance with the present disclosure.

As depicted in the example in FIG. 12, storage subsystem 1218 can include various components including a system memory 1210, computer-readable storage media 1222, and a computer readable storage media reader 1220. System memory 1210 may store program instructions that are loadable and executable by processing unit 1204. System memory 1210 may also store data that is used during the execution of the instructions and/or data that is generated during the execution of the program instructions. Various different kinds of programs may be loaded into system memory 1210 including but not limited to client applications, Web browsers, mid-tier applications, relational database management systems (RDBMS), virtual machines, containers, etc.

System memory 1210 may also store an operating system 1216. Examples of operating system 1216 may include various versions of Microsoft Windows®, Apple Macintosh®, and/or Linux operating systems, a variety of commercially-available UNIX® or UNIX-like operating systems (including without limitation the variety of GNU/

Linux operating systems, the Google Chrome® OS, and the like) and/or mobile operating systems such as iOS, Windows® Phone, Android® OS, BlackBerry® OS, and Palm® OS operating systems. In certain implementations where computer system 1200 executes one or more virtual machines, the virtual machines along with their guest operating systems (GOSs) may be loaded into system memory 1210 and executed by one or more processors or cores of processing unit 1204.

System memory 1210 can come in different configurations depending upon the type of computer system 1200. For example, system memory 1210 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 1210 may include a basic input/output system (BIOS) containing basic routines that help to transfer information between elements within computer system 1200, such as during start-up.

Computer-readable storage media 1222 may represent remote, local, fixed, and/or removable storage devices plus storage media for temporarily and/or more permanently containing, storing, computer-readable information for use by computer system 1200 including instructions executable by processing unit 1204 of computer system 1200.

Computer-readable storage media 1222 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1200.

Machine-readable instructions executable by one or more processors or cores of processing unit 1204 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to connect to one or more devices via the Internet. In some embodiments communications subsystem 1224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1228, event updates 1230, and the like on behalf of one or more users who may use computer system 1200.

By way of example, communications subsystem 1224 may be configured to receive data feeds 1226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:
  receiving, by a manager instance of a computing system, a first request for a first token to access a computing resource, the first request from a computing process of a plurality of computing processes associated with a service account,
  determining, by the manager instance of the computing system, an identity of the service account based at least in part on an authentication;
  generating, by the manager instance of the computing system, a second request for the first token based at least in part on the authentication;
  transmitting, by the manager instance of the computing system, the second request to a token issuance service of the computing system, the second request comprising a manager instance signature and the identity of the service account;
  generating, by the token issuance service of the computing system, a third request for the first token, the third request comprising the identity of the service account and a token issuance service signature;
  transmitting, by the token issuance service of the computing system, the third request to an identity service of the computing system;

determining, by the identity service of the computing system, whether to generate the first token based at least in part on a policy associated with the service account; and generating, by the identity service of the computing system, the first token based at least in part on determining whether to generate the first token.

2. The method of claim 1, wherein the method further comprises:

detecting a creation of a container for storing the computing process;

generating, by an application programming interface (API) server, a second token associated with the computing process based at least in part on detecting the creation of the container; and transmitting the second token to an agent of the computing system.

3. The method of claim 2, wherein the first request comprises the second token, and wherein the method further comprises:

transmitting a fourth request to the API server to authenticate the second token; and receiving from the API server a response indicating the second token is authenticated, wherein the response further comprises a respective identity of a cluster and a namespace associated with the service computing process, and wherein the identity service determines whether to generate the first token based at least in part on the respective identity of the cluster, the namespace, and the service account.

4. The method of claim 3, wherein the first request comprises a cryptographic signature, and wherein the method further comprises:

accessing a cryptographic key associated with the computing process;

decrypting the cryptographic signature based at least in part on the cryptographic key;

accessing a first hash value from the first request based at least in part on decrypting the cryptographic signature;

determining a second hash value based at least in part on the first request, comparing the first hash value to the second hash value, wherein the first request is authenticated based at least in part on the comparing the first hash value to the second hash value.

5. The method of claim 3, wherein the method further comprises:

transmitting the second token to an authentication provider of the computing system;

generating, by the authentication provider, a fourth request for a computing service managing the computing resource, wherein the fourth request comprises a fifth request from the computing process for the computing resource and the second token; and transmitting the fourth request to the computing service.

6. The method of claim 5, wherein the computing process is a first computing process, and wherein the method further comprises:

receiving, by the authentication provider, a sixth request for the computing resource from a second computing process associated with the service account;

generating a seventh request comprising the six the request and the second token; and transmitting the seventh request to the computing service.

7. The method of claim 1, wherein the method further comprises:

authenticating the second request is performed by a network interface controller that provides an interface between the manager instance and the token issuance service.

8. A computing system comprising:

one or more processors; and one or more computer-readable media having stored thereon a sequence of instructions, when executed, cause the one or more processors to:

receive, by a manager instance of the computing system, a first request for a first token to access a computing resource, the first request from a computing process of a plurality of computing processes associated with a service account, determine, by the manager instance of the computing system, an identity of the service account based at least in part on an authentication;

generate, by the manager instance of the computing system, a second request for the first token based at least in part on the authentication;

transmit, by the manager instance of the computing system, the second request to a token issuance service of the computing system, the second request comprising a manager instance signature and the identity of the service account;

generate, by the token issuance service of the computing system, a third request for the first token, the third request comprising the identity of the service account and a token issuance service signature;

transmit, by the token issuance service of the computing system, the third request to an identity service of the computing system;

determine, by the identity service of the computing system, whether to generate the first token based at least in part on a policy associated with the service account; and generate, by the identity service of the computing system, the first token based at least in part on determining whether to generate the first token.

9. The computing system of claim 8, wherein the sequence of instructions, when executed, further cause the one or more processors to:

detect a creation of a container for storing the computing process;

generate, by an application programming interface (API) server, a second token associated with the computing process based at least in part on detecting the creation of the container; and transmit the second token to an agent of the computing system.

10. The computing system of claim 9, wherein the sequence of instructions, when executed, further cause the one or more processors to:

transmit a fourth request to the API server to authenticate the second token; and receive from the API server a response indicating the second token is authenticated, wherein the response further comprises a respective identity of a cluster and a namespace associated with the service computing process, and wherein the identity service determines whether to generate the first token based at least in part on the respective identity of the cluster, the namespace, and the service account.

11. The computing system of claim 10, wherein the first request comprises a cryptographic signature, wherein the sequence of instructions, when executed, further cause the one or more processors to:

access a cryptographic key associated with the computing process;

decrypt the cryptographic signature based at least in part on the cryptographic key;

access a first hash value from the first request based at least in part on decrypting the cryptographic signature;

determine a second hash value based at least in part on the first request, compare the first hash value to the second hash value, wherein the first request is authenticated based at least in part on the comparing the first hash value to the second hash value.

12. The computing system of claim 10, wherein the sequence of instructions, when executed, further cause the one or more processors to:

transmit the second token to an authentication provider of the computing system;

generate, by the authentication provider, a fourth request for a computing service managing the computing resource, wherein the fourth request comprises a fifth request from the computing process for the computing resource and the second token; and transmit the fourth request to the computing service.

13. The computing system of claim 12, wherein the computing process is a first computing process, and wherein the sequence of instructions, when executed, further cause the one or more processors to:

receive, by the authentication provider, a sixth request for the computing resource from a second computing process associated with the service account;

generate a seventh request comprising the sixth request and the second token; and transmit the seventh request to the computing service.

14. The computing system of claim 8, wherein the sequence of instructions, when executed, further cause the one or more processors to:

authenticate the second request is performed by a network interface controller that provides an interface between the manager instance and the token issuance service.

15. One or more non-transitory computer-readable media having stored thereon a sequence of instructions that, when executed by one or more processors of a computing system, cause the computing system to:

receive, by a manager instance of the computing system, a first request for a first token to access a computing resource, the first request from a computing process of a plurality of computing processes associated with a service account, determine, by the manager instance of the computing system, an identity of the service account based at least in part on an authentication;

generate, by the manager instance of the computing system, a second request for the first token based at least in part on the authentication;

transmit, by the manager instance of the computing system, the second request to a token issuance service of the computing system, the second request comprising a manager instance signature and the identity of the service account;

generate, by the token issuance service of the computing system, a third request for the first token, the third request comprising the identity of the service account and a token issuance service signature;

transmit, by the token issuance service of the computing system, the third request to an identity service of the computing system;

determine, by the identity service of the computing system, whether to generate the first token based at least in part on a policy associated with the service account; and generate, by the identity service of the computing system, the first token based at least in part on determining whether to generate the first token.

16. The one or more non-transitory computer-readable media of claim 15, wherein the sequence of instructions, when executed, further cause the one or more processors to:

detect a creation of a container for storing the computing process;

generate, by an application programming interface (API) server, a second token associated with the computing process based at least in part on detecting the creation of the container; and transmit the second token to an agent of the computing system.

17. The one or more non-transitory computer-readable media of claim 16, wherein the sequence of instructions, when executed, further cause the one or more processors to:

transmit a fourth request to the API server to authenticate the second token; and receive from the API server a response indicating the second token is authenticated, wherein the response further comprises a respective identity of a cluster and a namespace associated with the service computing process, and wherein the identity service determines whether to generate the first token based at least in part on the respective identity of the cluster, the namespace, and the service account.

18. The one or more non-transitory computer-readable media of claim 17, wherein the first request comprises a cryptographic signature, and wherein the sequence of instructions, when executed, further cause the one or more processors to:

access a cryptographic key associated with the computing process;

decrypt the cryptographic signature based at least in part on the cryptographic key;

access a first hash value from the first request based at least in part on decrypting the cryptographic signature;

determine a second hash value based at least in part on the first request, compare the first hash value to the second hash value, wherein the first request is authenticated based at least in part on the comparing the first hash value to the second hash value.

19. The one or more non-transitory computer-readable media of claim 17, wherein the sequence of instructions, when executed, further cause the one or more processors to:

transmit the second token to an authentication provider of the computing system;

generate, by the authentication provider, a fourth request for a computing service managing the computing resource, wherein the fourth request comprises a fifth request from the computing process for the computing resource and the second token; and transmit the fourth request to the computing service.

20. The one or more non-transitory computer-readable media of claim 19, wherein the computing process is a first computing process, and wherein the sequence of instructions, when executed, further cause the one or more processors to:

receive, by the authentication provider, a sixth request for the computing resource from a second computing process associated with the service account;

generate a seventh request comprising the sixth request and the second token; and
transmit the seventh request to the computing service.

* * * * *